(12) United States Patent
Nicoll et al.

(10) Patent No.: US 11,576,349 B2
(45) Date of Patent: Feb. 14, 2023

(54) FLUID DELIVERY SYSTEMS, METHODS AND APPARATUS TO DISPENSE FLUID ON AN ANIMAL

(71) Applicant: NICKELMAN, LLC, Dover, DE (US)

(72) Inventors: Jeffrey D. Nicoll, Freedom, NH (US); Charles D. Mann, Marine on Saint Croix, MN (US)

(73) Assignee: Nickelman, LLC, Dover, DE (US)

( * ) Notice: Subject to any disclaimer, the term of this patent is extended or adjusted under 35 U.S.C. 154(b) by 163 days.

(21) Appl. No.: 16/997,657

(22) Filed: Aug. 19, 2020

(65) Prior Publication Data

US 2021/0051922 A1 Feb. 25, 2021

Related U.S. Application Data

(60) Provisional application No. 62/889,525, filed on Aug. 20, 2019, provisional application No. 62/888,984, filed on Aug. 19, 2019.

(51) Int. Cl.
*A01K 15/02* (2006.01)
*A01K 13/00* (2006.01)
*A01K 27/00* (2006.01)

(52) U.S. Cl.
CPC .......... *A01K 15/022* (2013.01); *A01K 13/006* (2013.01); *A01K 27/001* (2013.01); *A01K 27/002* (2013.01)

(58) Field of Classification Search
CPC .... A01K 27/00; A01K 27/001; A01K 27/009; A01K 27/002; A01K 15/022; A01K 13/006
USPC .......................... 119/718, 719, 905; 239/152
See application file for complete search history.

(56) References Cited

U.S. PATENT DOCUMENTS

| | | | |
|---|---|---|---|
| 2,791,202 A | 5/1957 | Doyle | |
| 4,090,650 A * | 5/1978 | Gotta | A45F 3/20 215/11.1 |
| 4,627,385 A * | 12/1986 | Vinci | A01K 15/022 239/152 |
| 5,217,143 A | 6/1993 | Aitken | |
| 5,431,308 A * | 7/1995 | Tchen | A47G 21/18 222/529 |
| 5,868,103 A * | 2/1999 | Boyd | A01K 15/021 119/908 |

(Continued)

FOREIGN PATENT DOCUMENTS

WO  WO-2017039612 A1 *  3/2017

OTHER PUBLICATIONS

International Search Report and Written Opinion from related PCT Appln. No PCT/IB2020/000695, dated Mar. 15, 2021.

(Continued)

*Primary Examiner* — Yvonne R Abbott-Lewis
(74) *Attorney, Agent, or Firm* — Grossman, Tucker, Perreault & Pfleger PLLC

(57) ABSTRACT

Fluid delivery systems, methods and apparatus to dispense a dose of fluid on an animal, which may be particularly used for behavior modification of the animal, are disclosed. A system may particularly comprise an apparatus wearable by the animal. The apparatus is suitable for storing a fluid contained therein, and dispensing a dose of fluid on the animal, particularly to spur or otherwise induce behavior modification of the animal, particularly in response to training stimuli during a training scenario.

30 Claims, 23 Drawing Sheets

(56) References Cited

U.S. PATENT DOCUMENTS

| | | | | |
|---|---|---|---|---|
| 6,223,744 | B1* | 5/2001 | Garon | A61M 15/0081 |
| | | | | 128/200.14 |
| 6,327,998 | B1 | 12/2001 | Andre et al. | |
| 6,581,811 | B1* | 6/2003 | Schillaci | A45F 3/16 |
| | | | | 220/666 |
| 6,588,376 | B1* | 7/2003 | Groh | A01K 27/009 |
| | | | | 119/718 |
| 6,598,770 | B2* | 7/2003 | Bolts | A45F 3/20 |
| | | | | 224/148.2 |
| 6,668,760 | B2* | 12/2003 | Groh | A01K 27/009 |
| | | | | 119/718 |
| 7,992,525 | B1* | 8/2011 | Fisher | A01K 15/02 |
| | | | | 119/860 |
| 9,398,756 | B2* | 7/2016 | Eckert | B05B 11/3015 |
| 9,861,079 | B2* | 1/2018 | Klossner | A01K 15/021 |
| 10,820,576 | B1* | 11/2020 | Colburn | A01K 27/005 |
| 2005/0217609 | A1* | 10/2005 | Dorton | A61D 11/00 |
| | | | | 119/72 |
| 2006/0065201 | A1* | 3/2006 | Cogliano | A01K 27/006 |
| | | | | 119/61.56 |
| 2011/0232586 | A1* | 9/2011 | Levy | A01K 27/007 |
| | | | | 239/289 |
| 2015/0250143 | A1* | 9/2015 | Klossner | A01K 27/009 |
| | | | | 119/719 |
| 2016/0095294 | A1* | 4/2016 | Valerio | A01K 27/001 |
| | | | | 119/671 |
| 2017/0055495 | A1* | 3/2017 | Atkins | A01K 7/00 |

OTHER PUBLICATIONS

"No Bark Collar Citronella Spray Collar, Anti-Bark Deterrent for Dogs Kit—Safe, Effective, and Humane Dog Barking Control Collar (1 PK)" (Downtown Pet Supply), Sep. 9, 2012, retrieved from <URL:https://www.amazon.com/Downtown-Pet-Supply-Citronella-Anti-Bark/dp/B00987HPFO/ref=sr _ 1_20?dchild=1 &keywords=dog%2Bspray%2Bbark%2Bcollar%2Bip64&qid= 1611859261&sr=8-20&th=i> cited in International Search Report.

"PetSafe Remote Spray Trainer—3 in 1 Dog Training Solution: Tone, Vibration, Spray-Citronella & Unscented Refill Cartridges, Rechargeable & Water-Resistant Collar, Reduce Bark and Correct Behavior", (Pet.safe), Jan. 10, 2019 . retrieved from URL:https:/ lwww.amazon.comiPetSafe-Trainer-T raining-Resistant-Citronella/ dp/B07JGBFCW9/ref=sr _ 1_2.

"White Silicone Tubing, 1/2"ID, 3/4"OD, 1/8'Wall, 10' Length' (Small Parts)", Apr. 1, 2006, retrieved from <URL:htlps:/www. amazon.com/Whlte-SiliconeTubing-ID-Wall-Length/dp/ B000FMWU38/ref=sr _ 1 _2?dchild=1&keywords=polymer% 2Btubing&qid=1611855232&sr=8-2&th=1>, cited in International Search Report.

* cited by examiner

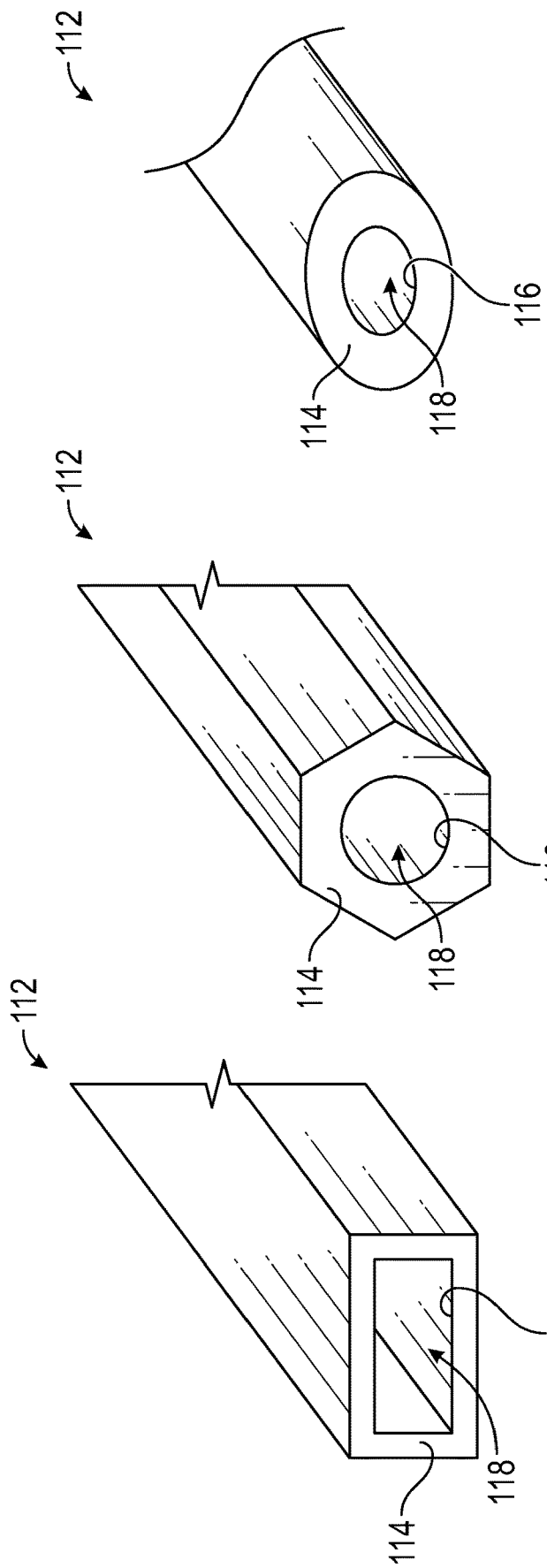

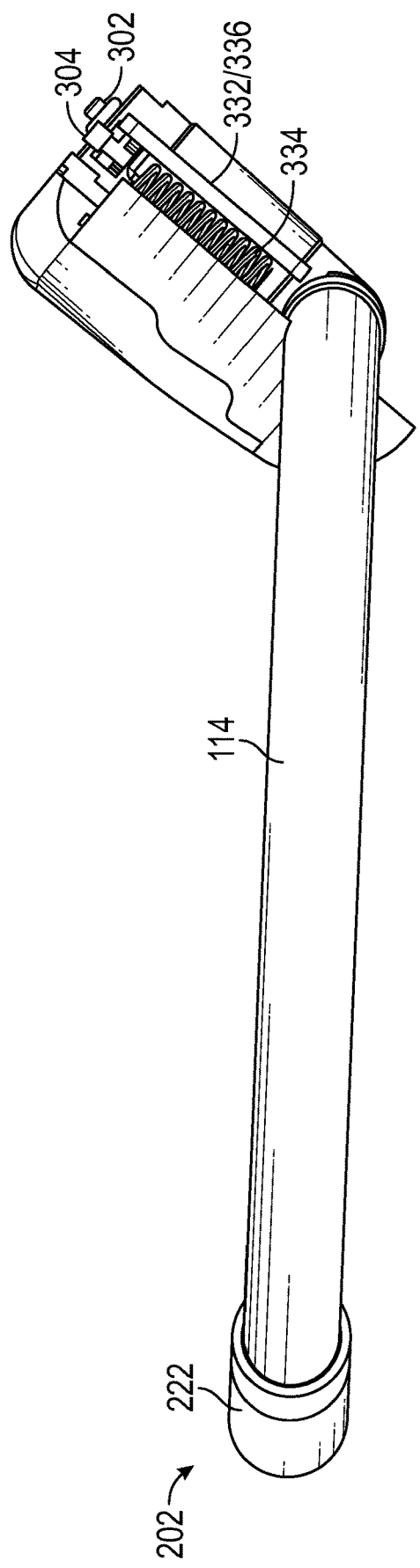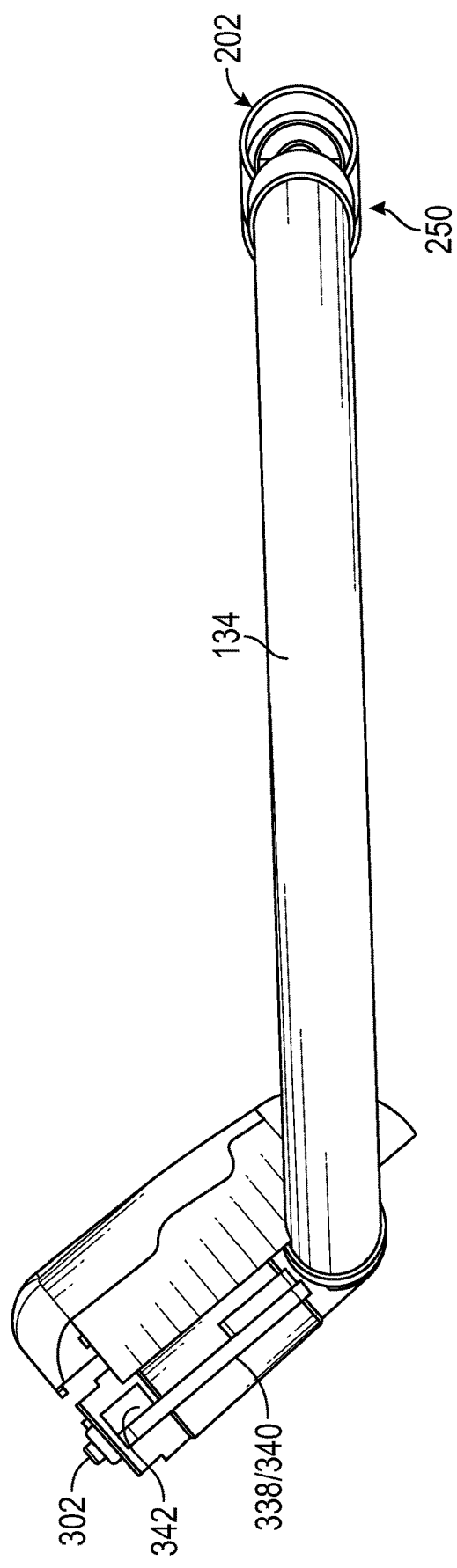
FIG. 2B
FIG. 2C

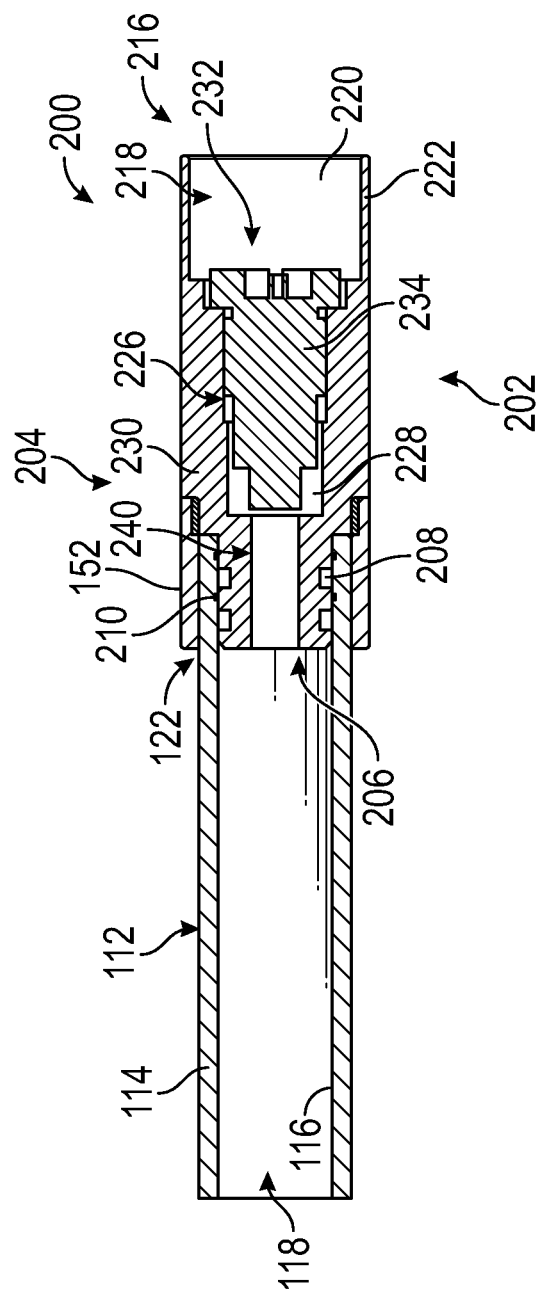
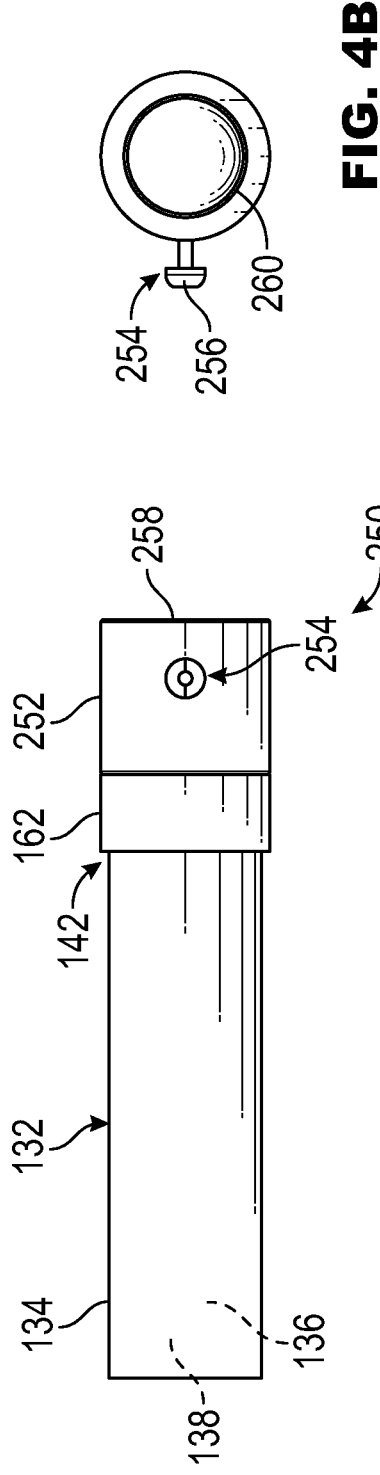
FIG. 3
FIG. 4A
FIG. 4B

FLUID DELIVERY SYSTEMS, METHODS AND APPARATUS TO DISPENSE FLUID ON AN ANIMAL

CROSS-REFERENCE TO RELATED APPLICATION

This non-provisional application claims the benefit of the filing date of U.S. provisional patent application Ser. No. 62/888,984, filed Aug. 19, 2019 and U.S. provisional patent application Ser. No. 62/889,525, filed Aug. 20, 2019, the entire disclosure of each of which is incorporated herein by reference.

FIELD

The present disclosure relates to a fluid delivery systems, methods and apparatus to dispense a dose of fluid on an animal, which may be particularly used for behavior modification of the animal. A system may particularly comprise an apparatus wearable by the animal, particularly for a pet, suitable for containing and dispensing a dose of fluid on the animal, particularly for behavior modification of the animal.

BACKGROUND

Fluid spray dispensing collar based training devices for canines have existed at least since approximately 1986, at which time a fluid spray release animal training system was disclosed in U.S. Pat. No. 4,627,385, entitled "Bark Restraining Device for Dogs", to Vinci.

Since their inception, fluid spray training collars have proved as effective, and far more humane, than collars applying a variable and often painful electric shock to a canine's throat region as an aversive training technique. However, while it may be generally well known that electric shock aversive training is effective, it is not as well know that releasing one or more sprays of a harmless fluid under a canine's chin as an irritant aversive may be equally, if not more, effective as an aversive training tool.

Since 1986, new applications using pressurized fluid spray release in human-animal interactions have been developed. However, not all applications have been aversive based applications. For example, fluid spray rewards based training is also possible. Moreover, in addition to aversive training for barking control, fluid spray release based aversive training systems for boundary and barrier control have been developed, as well as remote aversive training techniques.

However, none of the advancements in the field of animal spray training are understood to have addressed the storage tank arrangement and size (capacity), limiting factors in prior fluid spray dispensing collar devices. Prior spray dispensing collars have been limited in the tank size (capacity) for containing the pressurized fluid, as the only ergonomic location for the storage tank has been to include the tank in an enclosure *housing that hangs off the neck of the animal, which includes all the electronic and related components of the sprayer. For example, the enclosure housing that holds the storage tank also specifically holds the complex electronic printed circuit boards with all the signal processing and voltage regulating components, a release valve and solenoid for the spray, and a battery with a large capacity enough to run the associated circuitry.

Crowding all components into a single enclosure housing that hangs off the neck of the animal severely limits space (volume) for the pressurized holding tank. As such, often times the tank is exhausted prior to a successful training session, or before the animal ceases the undesired behavior. This requires a break in training to refill the tank, which reduces the effectiveness of the fluid spray dispensing collar.

Furthermore, an additional challenge of locating the storage tank in the enclosure housing that hangs off the neck of the animal has been leak prevention. Known storage tanks include a seam, and the length of the seam is vulnerable to a range of small leaks to complete seam failure, due to the constant pressure against the seam of the pressurized fluid, as well as the chemical nature of the fluid (liquid spray) propellant.

Attempts to minimize leaks have ranged from ultrasonic sealing of the seam to adding gaskets or "O" rings. However, a tank solution that eliminates seams and the need for gaskets, as well as minimizes entry and exit ports, is long overdue.

Moreover, an additional limiting factor regarding the storage tank is that the pressurized fluid requires head space, which further minimizes space for actual fluid. Head space may be understood as a volume inside the tank that does not contain any fluid for releasing. Rather, head space is the volume inside the tank reserved for the pressure that is necessary for any propellant to push the fluid out of the tank when the release valve is activated.

While, in theory, a larger capacity tank could be applied inside the single enclosure housing with the other sprayer components, such a larger capacity tank is not believed to have ever been put into practice, as this would make the enclosure housing hanging off the neck of the animal too weighty and/or cumbersome to effectively work as designed, or too awkward and unmanageable that the pet owner or trainer would choose not to put it on the animal for training. This is especially restrictive for smaller animals that are to be trained, where a large reservoir within the enclosure housing, by nature of their size, exclude smaller animals from practical usage.

A solution is one that moves the tank outside of the enclosure housing, which permits use of a smaller, more aesthetically pleasing housing which may not even appear as a training device. As such, it is an object of the present disclosure to provide a system with a seamless external pressurized storage tank, which increases fluid and head capacity, and which is connected to a separate enclosure housing containing a complex printed circuit board, a solenoid driven release valve and a battery, all while minimizing the volume the system occupies.

SUMMARY

Fluid delivery systems, methods and apparatus to dispense a dose of fluid on an animal, which may be particularly used for behavior modification of the animal, are disclosed. A system may particularly comprise an apparatus wearable by (attached to) the animal, however the apparatus may be disposed remote to the animal or adjacent the animal as disclosed herein. The apparatus is suitable for storing a fluid contained therein, and dispensing a dose of fluid on the animal, particularly as a pressurized spray to spur or otherwise induce behavior modification of the animal, particularly in response to training stimuli during a training scenario.

The systems, methods and apparatus may provide unprecedented compact component configurations, multi-purpose functionality and the ability to dispose a fluid storage tank in positions or locations concealed from view, which inhibits visual detection of the tank and/or the ability to dispose the fluid storage tank remotely from electronics of the apparatus, all while facilitating dispensing of fluid on an animal, particularly with multiple spray training and behavior modification modalities.

The apparatus includes a pressurized filling/refilling canister that allows the individual refilling the fluid storage tank with fluid (e.g. liquid with propellant gas) to easily connect and hold the refilling canister in place without additional assistance from the individual refilling the tank.

The apparatus may function to modify animal behavior through correcting negative behavior and/or encouraging positive behavior. The apparatus can be embodied in many forms to deliver the behavior-modifying spray to the animal. The spray release/delivery event may be initiated by numerous triggers such as, for example, user-initiated remote activation, visual recognition activation, scent activation, motion activation, auditory recognition activation, temperature activation, heart rate activation and/or blood pressure activation.

For user-initiated remote activation, a remote control hand-held by the user may communicate with the apparatus via a wireless electronic communication signal such as Bluetooth (wireless technology standard for wirelessly exchanging data between devices over short distances using short-wavelength UHF radio waves in the industrial, scientific and medical radio bands, from 2.400 to 2.485 GHz), WiFi (wireless networking technology that uses radio waves to provide wireless high-speed Internet and network connections, which is based on the IEEE 802.11 family of standards), and RFID (radio-frequency identification refers to wireless technology whereby digital data encoded in RFID tags are captured by a reader via radio waves.)

The apparatus detailed herein utilizes a seamless, externally positioned tubular reservoir/storage tank, which eliminates a need to include the fluid storage tank in a same enclosure housing that contains all the other components required to operate a fluid sprayer. The present disclosure additionally allows for an increase in a capacity of the fluid storage tank, and provides ergonomic designs that incorporate the function of a sprayer with a form of the animal designated to wear, or be affected by, the training device.

The fluid storage tank may provide the greatest capacity storage with the smallest intrusiveness on the animal, particularly be relocating and redistributing the storage of pressurized fluid from a front centered position directly beneath a canine's jaw/nose to an anatomically complementary location around the canine's neck. In general, the external tubular reservoir/storage tank of the present disclosure will have a volume which is 5-10 times greater than a volume of an internal tank of the art, i.e. provided as part of the enclosure housing. For example, the tubular reservoir/storage tank of the present disclosure may provide up to 200 sprays before requiring a refill, whereas certain sprayers in the art may only provide 30-40 sprays before requiring a refill. More particularly, the tubular reservoir/storage tank of the present disclosure may have a fluid volume in a range between and including 2 ml (milliliters) to 60 ml, and more particularly in a range between and including 4 ml to 45 ml, and even more particularly in a range between and including 6 ml to 40 ml. An exemplary range for domesticated animals may be between and including 8 ml to 20 ml, and more particularly 10-15 ml. With regards to spray volume, the volume of fluid per spray may be in a range between and including 0.02 ml to 0.2 ml, and more particularly 0.05 ml to 0.1 ml. By way of example, a fluid volume of 10 ml will yield about 200 sprays.

Further, an effective result of the disclosure is to significantly reduce a size of the spray enclosure housing in total, and increase a number of sprays that can be delivered before refilling the spray training device.

In other applications, the

FIGURES

The above-mentioned and other features of this disclosure, and the manner of attaining them, will become more apparent and better understood by reference to the following description of embodiments described herein taken in conjunction with the accompanying drawings, wherein:

FIG. 1 is a perspective view of a fluid delivery system of the present disclosure which comprises an annular ring apparatus and an attachable leash;

FIG. 1A shows the annular ring apparatus of FIG. 1 disposed on an animal;

FIG. 1B-1D shown different profiles of the tubular body of the annular ring apparatus of FIG. 1;

FIG. 2A is a front view of the annular ring apparatus of FIG. 1 with a front member of the enclosure housing removed;

FIG. 2B is a left view of the annular ring apparatus of FIG. 1 with a front member of the enclosure housing removed;

FIG. 2C is a left view of the annular ring apparatus of FIG. 1 with a front member of the enclosure housing removed;

FIG. 2D is a longitudinal cross-section of the annular ring apparatus of FIG. 1 taken through the valve and the T-coupler.

FIG. 3 is a longitudinal cross-sectional side view of a first elongated tubular member of the annular ring apparatus of FIG. 1;

FIG. 4A is a longitudinal side view of a second elongated tubular member of the annular ring apparatus of FIG. 1;

FIG. 4B is an end view of the second elongated tubular member of FIG. 4A;

FIG. 5 is a top view of the annular ring apparatus of FIG. 1;

FIG. 6 is a front view of the annular ring apparatus of FIG. 1;

FIG. 7 is a side view of the annular ring apparatus of FIG. 1;

FIG. 8 is a front view of an enclosure housing front member of the annular ring apparatus of FIG. 1;

FIG. 9 is a front view of an enclosure housing rear member of the annular ring apparatus of FIG. 1;

FIG. 10 is a front view of an enclosure housing top member of the annular ring apparatus of FIG. 1;

FIG. 11 is a perspective view of a battery pack for the annular ring apparatus of FIG. 1;

FIG. 12 is a perspective view of a battery charger for the annular ring apparatus of FIG. 1;

FIG. 13 is a refill canister coupled to the first connector of the first elongated tubular member of the annular ring apparatus of FIG. 1;

FIGS. 14A-14H show a hand-held remote control which may be used to remotely operate the annular ring apparatus of FIG. 1;

FIG. 15 shows the annular ring apparatus of FIG. 1 disposed as part of a harness;

FIG. 16 shows the annular ring apparatus of FIG. 1 disposed as part of clothing garment, such as a petticoat;

FIG. 17 is a perspective view of another annular ring apparatus of the present disclosure;

FIG. 18 is another perspective view of the annular ring apparatus of FIG. 17 with the housing removed;

DETAILED DESCRIPTION

Figure 1:
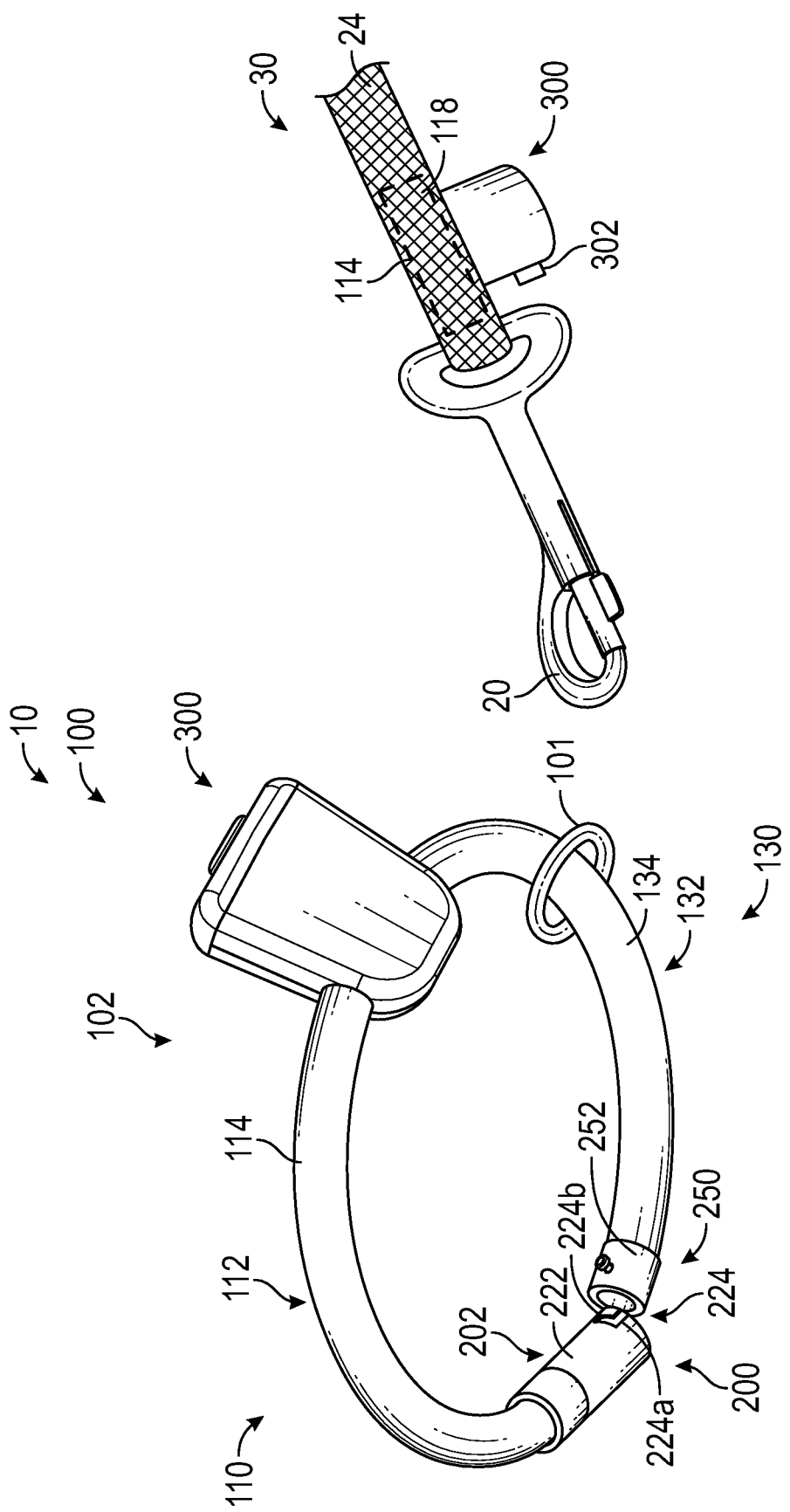

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

The present disclosure relates to fluid delivery systems, methods and apparatus for behavior modification of a (non-human) animal. The animal may be, for example, a mammal such as a canine (dog), a feline (cat), a leporidae (rabbit/hare), an equine (horse) and a porcine (pig), sheep, or goat. The animal may be a domesticated pet or a farm animal. The present disclosure also relates to fluid delivery systems, methods and apparatus for dispensing a fluid on a human.

Figure 1A:

Referring now to FIG. 1, a system 10 may particularly comprise an annular ring apparatus 100 wearable by (attached to) the animal for behavioral training. The apparatus 100 may be configured to extend around the neck of the animal, shown in the form of a collar. While the apparatus 100 is shown as a collar in isolation, the apparatus 100 may be part of a garment (e.g. collar of a shirt or a coat) or part of a harness which also extends around the head and/or torso of the animal. In certain embodiments, the apparatus, as a collar, may include a ring, such as a closed annular ring 101, to which a clasp 20 of a leash 30, may be attached to walk the animal. FIG. 1A shows apparatus 100 disposed on an animal, particularly a canine.

The apparatus 100 is suitable for storing a fluid contained therein, and dispensing the fluid to spur or otherwise induce behavior modification of the animal, particularly in response to training stimuli during a training session or other training scenario, and may be part of a remote-controlled, fluid (spray) release/delivery, animal training system.

As shown, apparatus 100 comprises a tubular band 102, a separable connector device 200 and a fluid dispensing device 300.

As shown, tubular band 102 comprises a first elongated tubular member 110 and a second elongated tubular member 130. First elongated tubular member 110 comprises a first flexible (resiliently deformable) tubing segment 112 having an annular (cylindrical) tubular body 114, which contains and defines a (cylindrical) lumen 116 (see FIG. 3), which provides a tubular reservoir 118 of the first elongated tubular member 110 and the tubular band 102. The tubular body 114 is seamless along its longitudinal length, and may have an outer diameter in a range between and including 6 mm (millimeters) to 12 mm, and more particularly in a range between an including 7 mm to 10 mm. The tubular body 114 may have an inner diameter in a range of between and including 4 mm to 10 mm, and more part in a range between and including 5 mm to 8 mm. In a particular embodiment the tubular body 114 may have an outer diameter of 8 mm and an inner diameter of 6 mm.

Similarly, second elongated tubular member 130 comprises a second flexible (resiliently deformable) tubing segment 132 having an annular (cylindrical) tubular body 134, which contains and defines a (cylindrical) lumen 136 (see FIG. 4A), which provides a tubular reservoir 138 of the second elongated tubular member 130 and the tubular band 102. The tubular body 134 is seamless along its length and may have an outer diameter in a range of between and including 6 mm to 12 mm, and more particularly in a range between and including 7 mm to 10 mm. The tubular body 134 may have an inner diameter in a range of between and including 4 mm to 10 mm, and more particularly in a range between and including 5 mm to 8 mm. In a particular embodiment the tubular body 134 may have an outer diameter of 8 mm and an inner diameter of 6 mm. Preferably the tubular bodies 114, 134 have the same outer and inner diameter, respectively.

When the tubular body 114, 134 is formed as a polygon, it may particularly be rectangular with an outer width which is different (greater than) the outer thickness. For example, the tubular body 114, 134 may have a width in a range between and including 9 mm to 30 mm, and more particularly in a range between and including 12 mm to 25 mm, while the thickness may be in a range between and including 4 mm to 12 mm, and more particularly in a range between and including 6 mm to 10 mm. An exemplary polygonal tubular body 114, 134 may have a width of 19 mm and a thickness of 6 mm.

During use of apparatus 100, tubular reservoirs 118, 138 each provide a portion of a tubular, pressurized fluid storage tank for fluid, which is ultimately to be expelled from fluid dispensing device 300, as explained in greater detail below. As shown, due to the geometry of the tubular reservoirs 118, 138, the tubular reservoirs 118, 138 are concealed with the apparatus 100, whether such be the collar, garment or harness. Furthermore, the tubular reservoirs 118, 138 are not too heavy or cumbersome to be used with smaller animals.

Each tubular body 114, 134 is constructed of a durable extruded or molded plastic material that is strong enough to resist deformation or leakage, particularly when pressurized by the fluid internally to a pressure in a range between and including 5 psi. (pounds per square inch) to 100 psi., and more particularly in a range between and including 20 psi. to 90 psi., and even more particularly in a range between and including 30 psi. to 80 psi. An exemplary pressure may be 75 psi.

Each tubular body 114, 134 may comprise, essentially consist of or consist of a polymer, particularly a molded (extruded) thermoplastic polymer. More particularly, an exemplary thermoplastic polymer may be a polyamide (also known as nylon), particularly polyamide 6, 66 and 11.

In order to provide the circular contour of each tubular body 114, 134, each tubular body 114, 134 is post-extrusion thermoformed/molded to afford the proper curvature when worn by the animal. The forming and shaping process supports the inside diameter and takes a straight section of tubing and imparts precise compound curvature with straight sections as needed to impart proper function to the device, wearability and functionality through proper fluid and headspace positioning.

Each tubular body 114, 134 may be formed as a single layer tubular body or a multi-layer tubular body of single piece construction (when viewed in profile cross section). While a cylindrical (circular) tubular body 114, 134 is illustrated, other profile shapes may include oval, elliptical or polygonal (e.g. square, rectangular, pentagon, hexagon octagonal) profiles. As shown in FIG. 1B, the tubular body 114, 134 is rectangular, while in FIG. 1C, the tubular body 114, 134 is octagonal and FIG. 1D the tubular body 114, 134 is oval.

As shown, each tubular body 114, 134 is exposed to environmental elements (e.g. sunlight, heat, cold, precipitation) and does not require any additional protective covering or structure for the collar to be functional. For example, each tubular body 114, 134 has sufficient strength to function as a collar, without requiring additional nylon webbing/strap, leather band to provide sufficient structure for the collar.

Figure 2A:
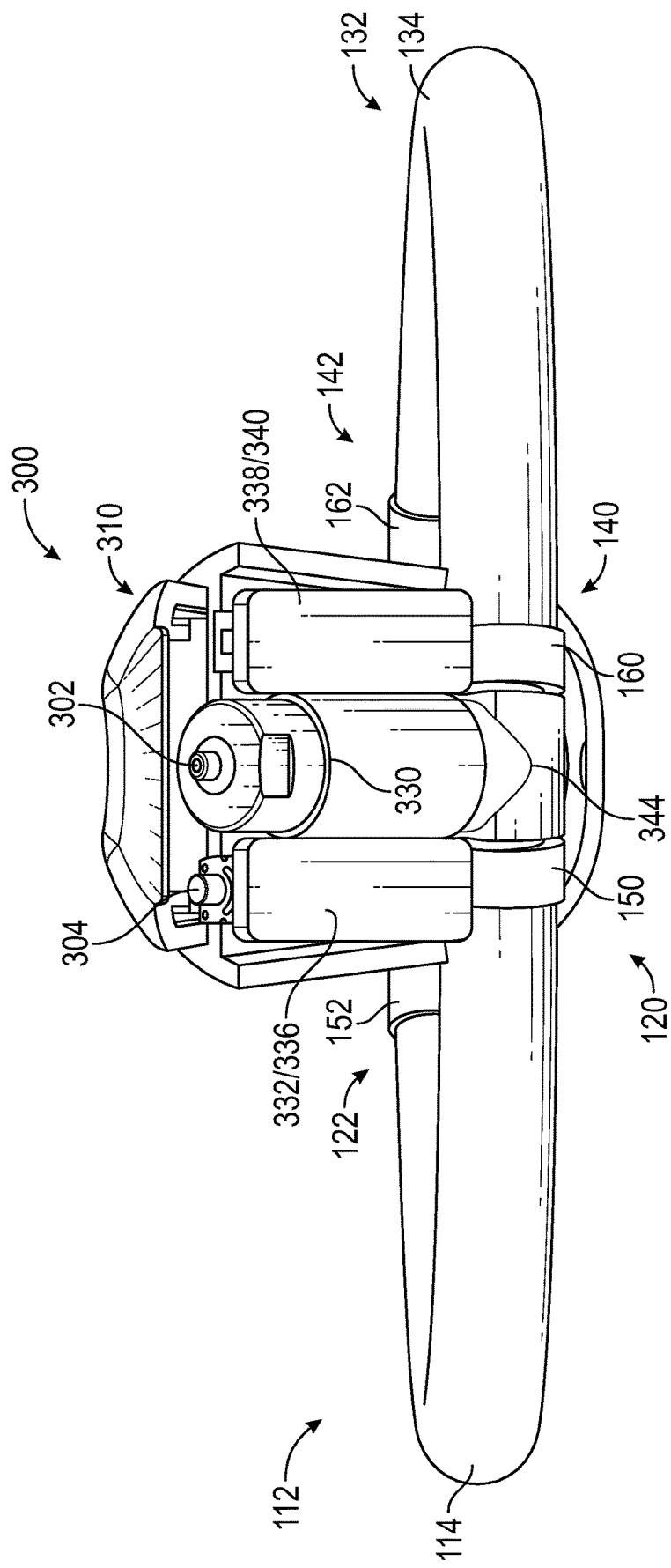

Referring to FIG. 2A, a first end region 120 of the tubing segment 112/tubular body 114 of the first tubular member 110 may be mechanically coupled with the fluid dispensing device 300 via a first end coupling device 150, while a second (opposing) end region 122 of the tubing segment 112/tubular body 114 of the first tubular member 110 may be mechanically coupled with the separable connector device 200 via a second end coupling device 152. The first end coupling device 150 and the second end coupling device 152 may each be a metal crimp ring. The crimp rings are made of a specific alloy of annealed copper with a surface treatment that imparts integral surface coloring and protection to the rings.

Continuing with FIG. 2A, a first end region 140 of the tubing segment 132/tubular body 134 of the second tubular member 130 may be mechanically coupled with the fluid dispensing device 300 via a first end coupling device 160, while a second (opposing) end region 142 of the tubing segment 132/tubular body 134 of the second tubular member 130 may be mechanically coupled with the separable connector device 200 via a second end coupling device 162. The first end coupling device 160 and the second end coupling device 162 may each be a metal crimp ring. The crimp rings are made of a specific alloy of annealed copper with a surface treatment that imparts integral surface coloring and protection to the rings.

Referring now to FIG. 3 and FIG. 4A and FIG. 4B, separable connector device 200 may be separable into two mating connectors, comprising a first connector 202 and a second connector 250. When assembled, first connector 202 and second connector 250 may form at least one of a mechanical connection and a magnetic connection. When assembled, connector 202 and second connector 250 may preferably form the mechanical connection, as well as the magnetic connection.

Referring to FIG. 3, first connector 202 may comprise a cylindrical body 204, which may be formed of metal, particularly a metal which is magnetic, such as steel containing iron. Cylindrical body 204 comprises a barbed cylindrical prong 206 for insertion into the lumen 116 at the end region 122 of the first tubing segment 112, which forms a press (interference) fit with the tubular body 114. Prong 206 may include at least one O-ring seal 208, arranged between barbs 210 in a longitudinal direction of the prong 206/body 204, to inhibit fluid from leaking therebetween. Once prong 206 is inserted into the lumen 116 at the end region 122 of the first tubing segment 112, the coupling device 152, in the form of the crimp ring, may be crimped over the prong 206 and the tubular body 114 to create a fluid-tight seal therebetween. The O-rings are made of polychloroprene or HNBR rubber resistant to refrigerant fluids and essential oils.

Cylindrical body 204 further includes a longitudinally arranged through-bore 216. An entrance region 218 of the through-bore 216 provides a cylindrical cavity/socket 220 defined by a cylindrical wall section 222 of the body 204, which is configured to receive a cylindrical protrusion 252 of the second connector 250, as explained in greater detail below. Cylindrical wall section 222 also defines at least one L-shaped aperture 224 (see FIG. 1) which operates as a bayonet connector catch, as also explained in greater detail below.

An intermediate region 226 of the through-bore 216 provides a cylindrical cavity/socket 228 defined by cylindrical wall section 230 which provides a valve seat for a longitudinally movable, spring biased valve body 234 of a valve 232. An exit region 240 of the through-bore 216 extends through the prong 206.

Referring to FIG. 4A and FIG. 4B, second connector 250 may comprise a cylindrical protrusion 252, which is configured to be received into the cylindrical cavity/socket 220 of the first connector 202. The cylindrical protrusion 252 includes a radially extending pin 254 having a bulbous head 256, which operates as a bayonet connector lug. The terminal end 258 of the second connector 250 may further include a permanent magnet 260.

During assembly of first connector 202 and second connector 250, the cylindrical protrusion 252 of the second connector 250 is disposed within cylindrical cavity/socket 220 of the cylindrical body 204 of the first connector 250. More particularly, with translational (axially) movement of at least one of the first connector 220 and the second connector 250 towards one another, the cylindrical protrusion 252 of the second connector 250 may fully enter the cylindrical cavity/socket 220 of the first connector 202 when radially extending pin 254 of the second connector 250 is axially (longitudinally) aligned with the L-shaped aperture 224 in the cylindrical wall section 222 of the first connector 202, such that the radially extending pin 254 is disposed in the axially extending segment 224a (see FIG. 1) of the L-shaped aperture 224.

Once the radially extending pin 254 of the second connector 250 bottoms out against the wall section 222 of the first connector 202 defining the axially extending segment 224a of the L-shaped aperture 224, at least one of the first connector 202 and the second connector 250 may then be rotated relative to one another, such that the radially extending pin 254 is now disposed in the circumferentially extending segment 224b (see FIG. 0.1) of the L-shaped aperture 224.

Once the radially extending pin 254 of the second connector 250 is disposed in the circumferentially extending segment 224b of the L-shaped aperture 224, the first connector 202 and the second connector 250 may not be separated translationally (axially/longitudinally), due to a mechanical interference (i.e. positive mechanical engagement) formed between the radially extending pin 254 of the second connector 250 and the wall section 222 of the first connector 202 forming an interlocked mechanical connection.

Furthermore, once mechanically locked, the permanent magnet 260 of the second connector 250 may form a magnetic connection with the cylindrical body 204 of the first connector 202 which inhibits the first connector 202 and the second connector 250 from rotating relative to one another, thus inhibiting separation of the mechanical connection.

Figure 5:
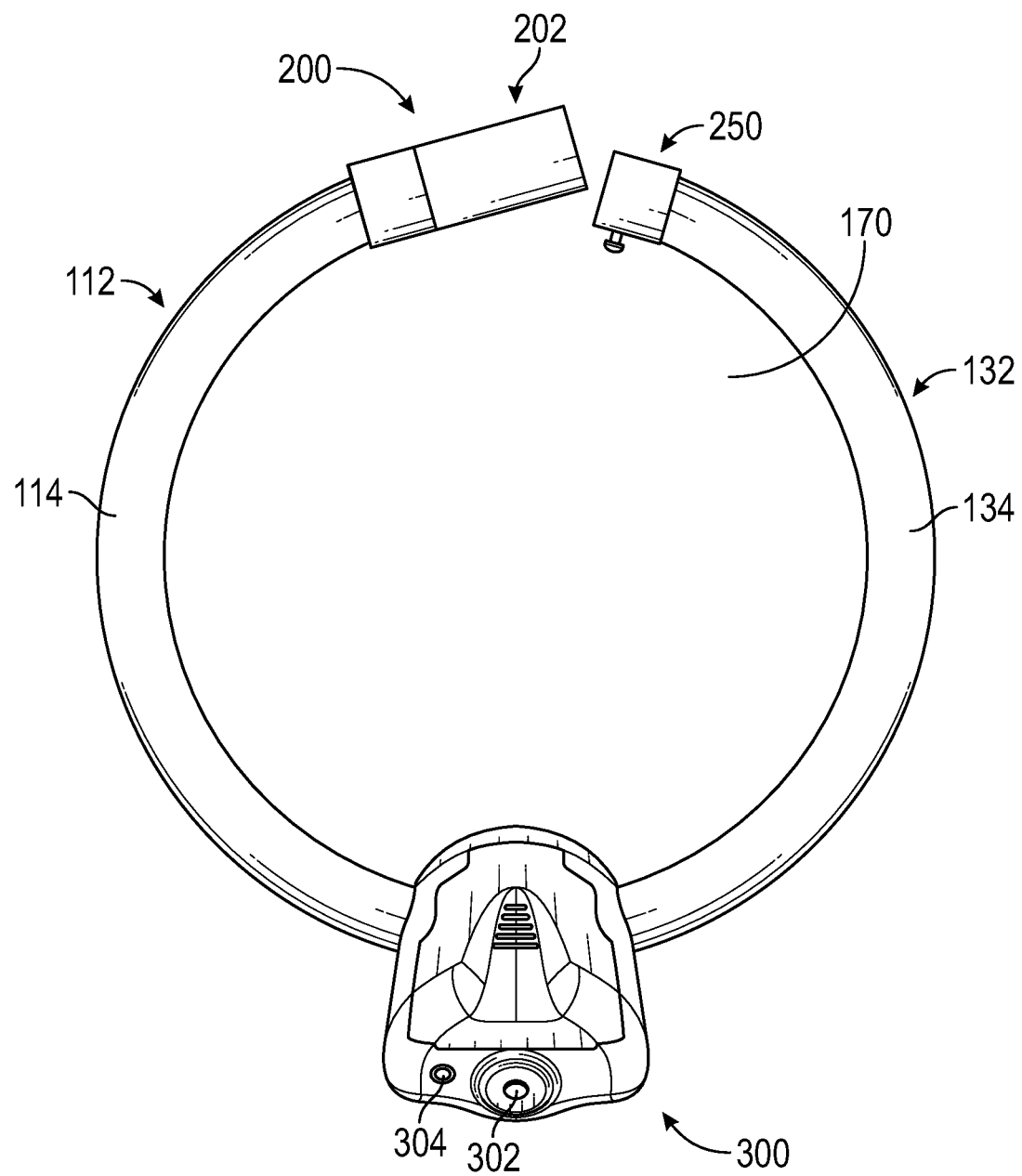

Referring to FIG. 5, once the first connector 202 and the second connector 250 are connected, the apparatus 100, and more particularly the collar, forms a continuous single loop closed annular ring (i.e. a 360 degree loop), and when not connected, an open annular ring. When the first connector 202 and the second connector 250 are connected, the closed annular ring defines a substantially circular aperture 170, having an inner diameter suitable for the apparatus 100 to be worn by the animal. The inner diameter of the apparatus 100 may be in a range between and including 50 mm to 250 mm, and more particularly in a range between and including 60 mm to 200 mm, and more particularly in a range between and including 70 mm to 150 mm.

While apparatus 100 is shown with both the first connector 202 and the second connector 250, it should be understood that either or both the first connector 202 and the second connector 250 may not necessarily be required, particularly if the apparatus 100 is part of a garment or a harness which may suitably hold the apparatus 100 on the animal, absent the first connector 202 and/or the second connector 250.

Referring to FIG. 5, fluid dispensing device 300 may be particularly disposed at a side of the apparatus 100 which is opposite the separable connector device 200. With respect to a center of the closed annular ring, fluid dispensing device 300 and connector device 200 are disposed at an angle of 180 degrees to one another.

As shown from FIG. 2A, fluid dispensing device 300 comprises a fluid dispensing port 302 and an on/off button switch 304, which displays a green LED indicator lamp when the fluid dispensing device 300 is powered on, and a red LED indicator lamp is powered off.

Figure 6:
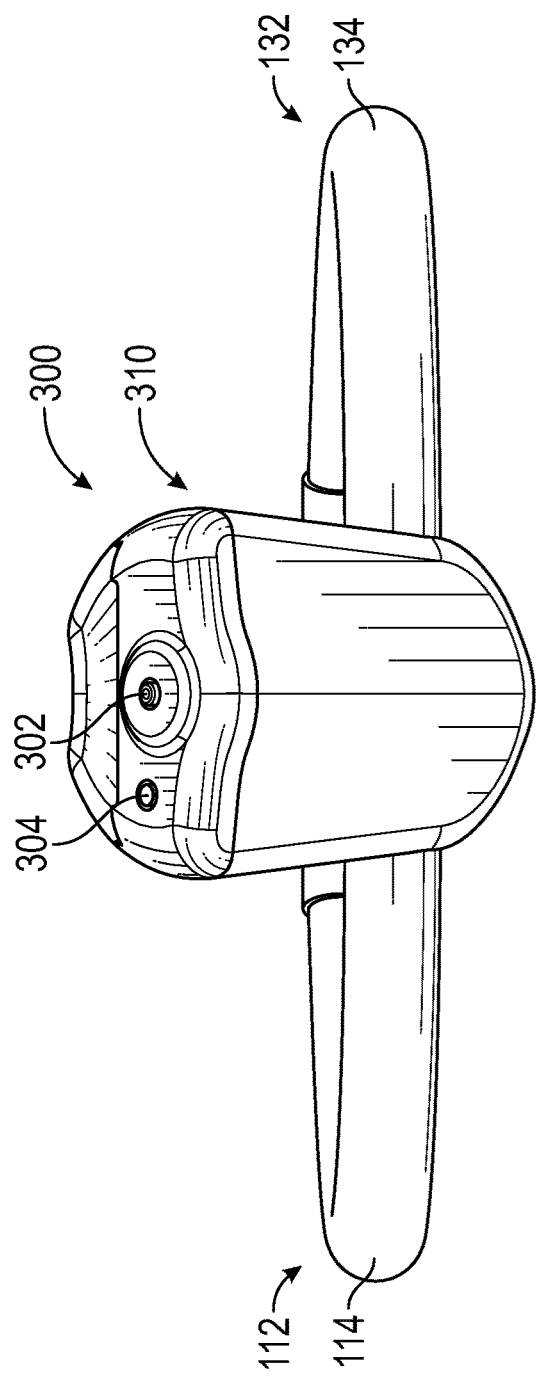

Referring to FIG. 6, fluid dispensing port 302 and the on/off button switch 304 are disposed in a housing 310 which provides a water-resistant enclosure for components of the fluid dispensing device 300 therein. More particularly, housing 310 may be sealed to meet IP64 and/or IP67 fluid and particulate ingress requirements per International Electrotechnical Commission International Standard IEC 60529: 1989+A1:1999+A2:2013, which is incorporated herein by reference. With an IP64 rating, enclosure 310 may be understood to be protected from total dust ingression, as well as protected from water spray in any direction. With an IP67 rating, enclosure 310 may be understood to be protected from total dust ingression, as well as protected from immersion between 15 centimeters and 1 meter in depth. If should be understood that, in satisfying the requirement of IP64, housing 310 also satisfies the requirements of IP00, IP01, IP02, IP03, IP04, IP10, IP11, IP12, IP13, IP14, IP20, IP21, IP22, IP23, IP24, IP30, IP31, IP32, IP33, IP34, IP40, IP41, IP42, IP43, IP44, IP50, IP51, IP52, IP53, IP54, IP60, IP61, IP62 and IP63. If should be understood that, in satisfying the requirement of IP 67, housing 310 further satisfies the requirements of IP00, IP01, IP02, IP03, IP04, IP05, IP06, IP07, IP10, IP11, IP12, IP13, IP14, IP15, IP16, IP17, IP20, IP21, IP22, IP23, IP24, IP25, IP26, IP27, IP30, IP31, IP32, IP33, IP34, IP35, IP36, IP37, IP40, IP41, IP42, IP43, IP44, IP45, IP46, IP47, IP50, IP51, IP52, IP53, IP54, IP55, IP56, IP57, IP60, IP61, IP62, IP63, IP64, IP65, and IP66.

The IP Code, International Protection Marking or IEC standard 60529, sometimes interpreted as Ingress Protection Marking or IP Rating, classifies and rates the degree of protection provided against intrusion (objects including body parts), dust, accidental contact, and water by mechanical casings and electrical enclosures. It is published by the International Electrotechnical Commission (IEC) as noted above.

Fluid dispensing port 302 may particularly be configured as a spray dispensing port, which dispenses a fluid in a form of a pressurized spray, particularly beneath the lower jaw of the animal, proximate the nose. In such instance, fluid dispensing device 300 may more particularly be referred to as a spray dispensing device.

Figure 7:
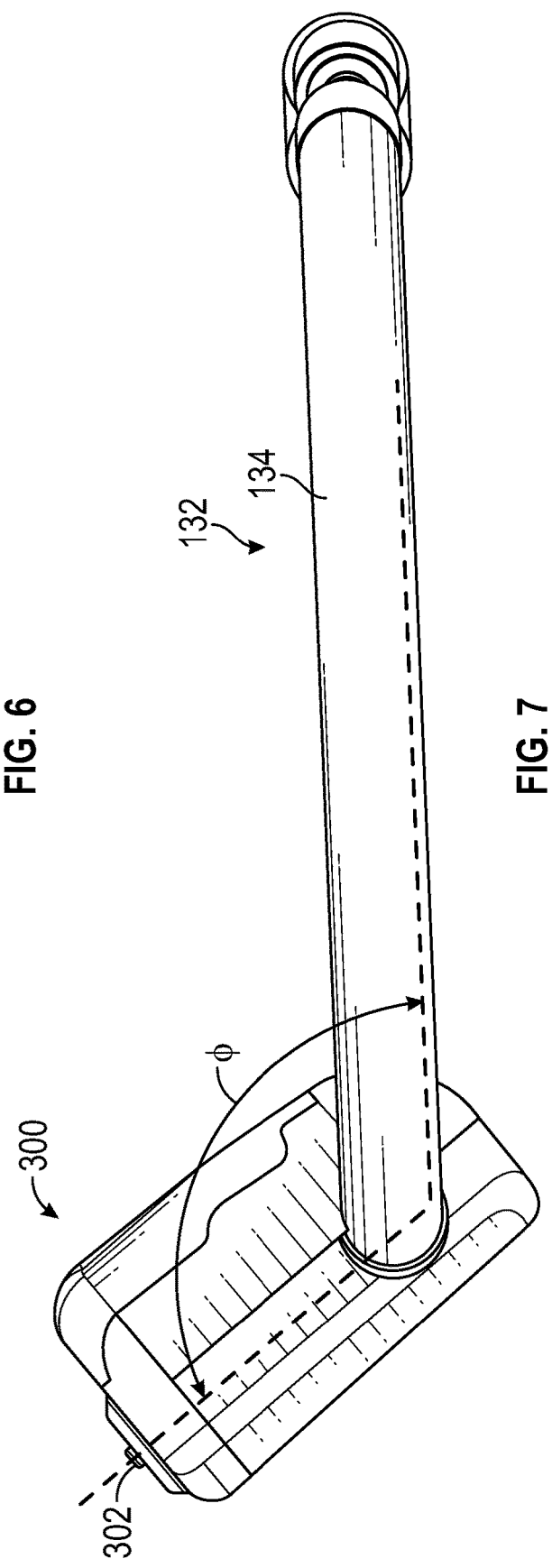

Referring to FIG. 7, the fluid dispensing port 302 is aimed such that a longitudinal axis of a fluid valve 330 (see FIG. 2A) and/or a primary trajectory of fluid from the port 302 is at an angle θ relative to a plane of aperture 170 in a range between and including 100 degrees to 150 degrees, and more particularly in a range between and including 110 degrees to 140 degrees, and even more particularly in a range between and including 120 degrees to 130 degrees. As shown, the angle θ is 128 degrees. The fluid dispensing port 302 is designed to spray the fluid in a shape of a cone, with an angle of 45 degrees to the longitudinal axis of the valve 330. The height of the cone exceeds 150 mm, and may more particularly exceed 200 mm, and even more particularly exceed 250 mm, such as 300 mm.

Figure 8:
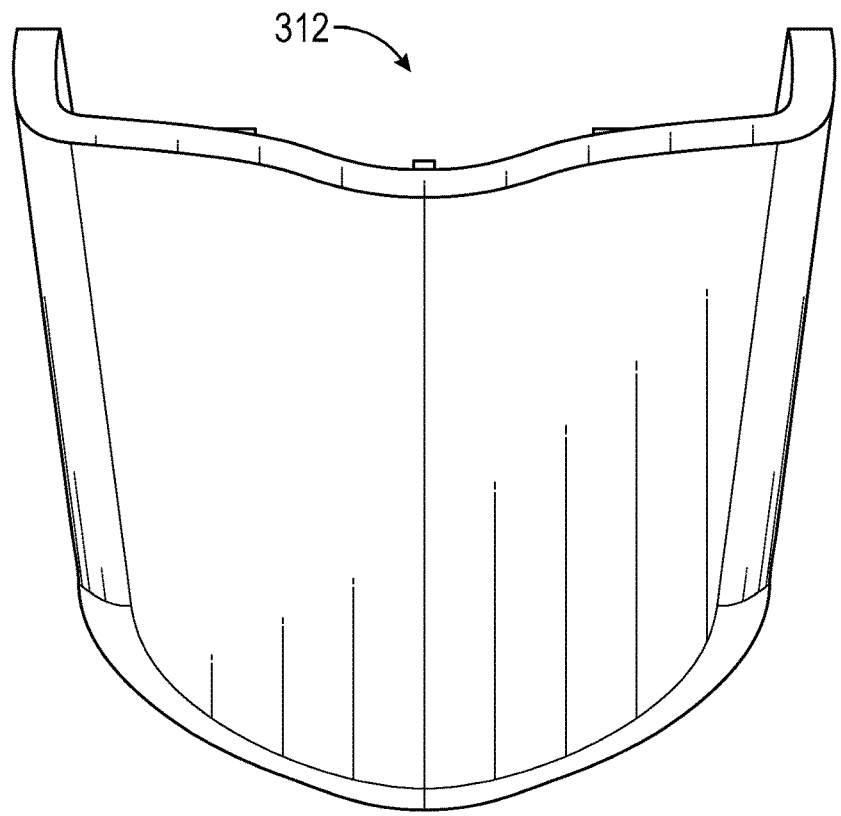
Figure 9:
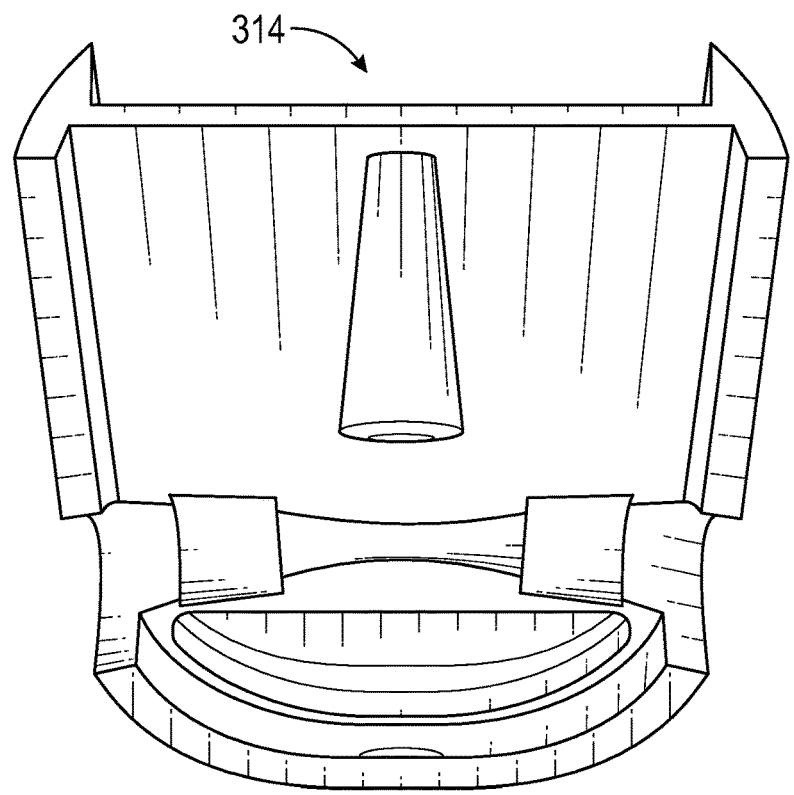
Figure 10:
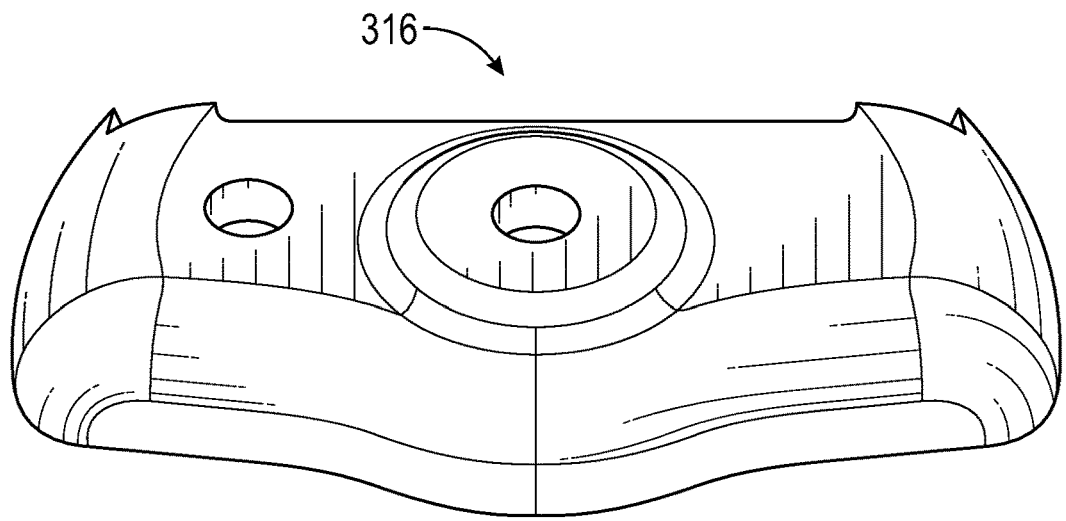

Referring to FIGS. 8-10, housing 310 comprises an enclosure housing front member 312, an enclosure housing rear member 314 and an enclosure housing top member 316.

Figure 11:
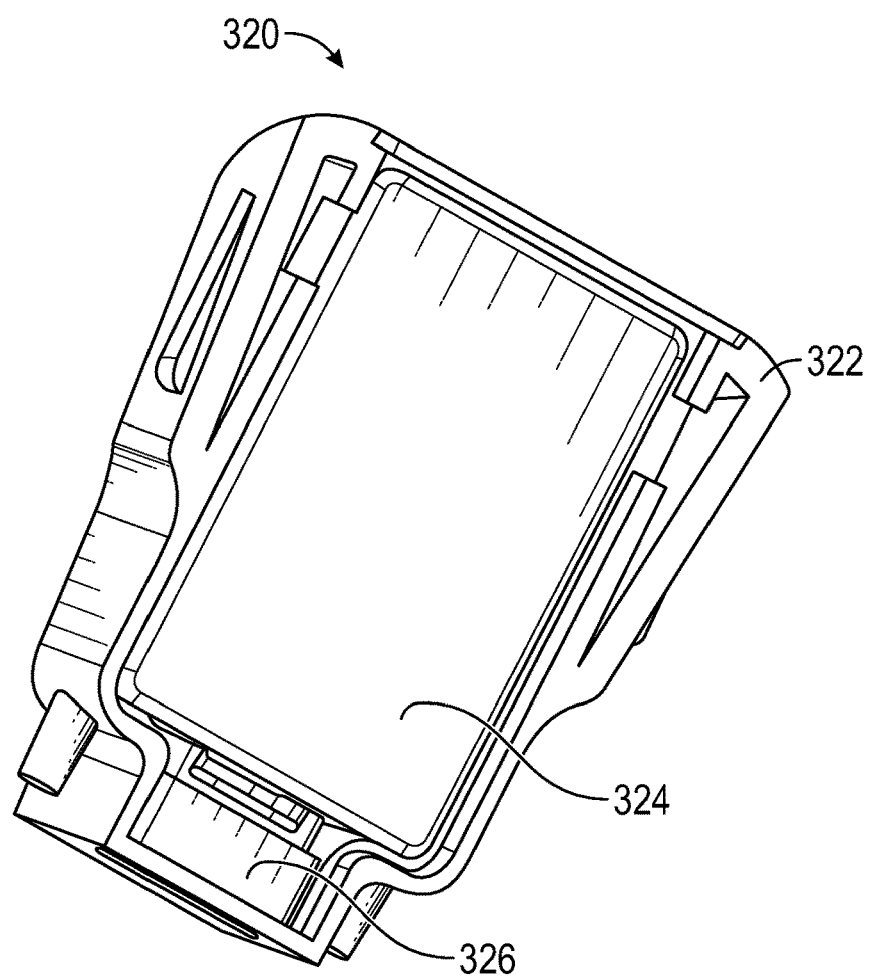
Figure 12:
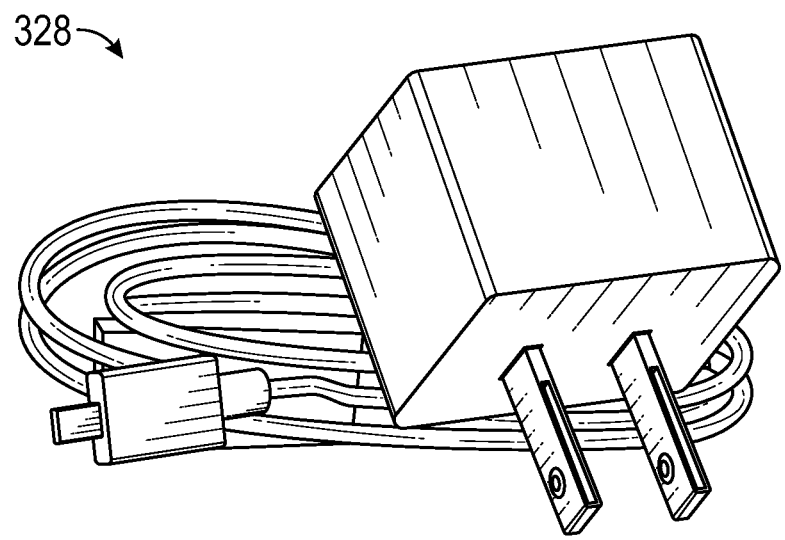

Referring to FIG. 11, in order to provide the fluid dispensing device 300 with electrical (battery) power, fluid dispensing device 300 includes an on-board removable, rechargeable battery pack 320. Battery pack 320 comprises a battery 324 housed/enclosed within a battery pack cover 322. Battery pack 320 is removeably connectable to the housing 310, particularly via battery pack cover 322 being connectable to and separable from an outer (rear) side of the housing rear member 314. The battery 324 is made rechargeable via a charging port 326, which may be a USB port and associated electronics, which is also part of the battery pack 320. Referring to FIG. 12, an AC to DC transformer/charger 328 may be used to charge the battery 324.

Housing 310, particularly the housing front member 312, the housing rear member 314 and the housing top member 316, as well as the battery pack cover 322 may comprise, essentially consist of or consist of a polymer, particularly an injection molded thermoplastic polymer. More particularly, an exemplary thermoplastic polymer may be polyamide (also known as nylon) 6 with 10% glass fiber reinforcement.

Referring to FIGS. 2A-2C, disposed between the housing front member 312 and the housing rear member are a valve 330, a radio-frequency receiver 332 including a helix antenna 334 and associated electronics (e.g. microprocessor, sound recognition integrated circuitry) on a printed circuit board 336, a solenoid driver 338 including associated electronics (e.g. microprocessor) on a printed circuit board 340, a (piezo) microphone 342 and a coupling 344, shown as a T-coupler.

The valve 330 may more particularly be an electromechanical (electromagnetic solenoid) valve. While valve 330 is shown to be an electromagnetic (solenoid) valve, other valve configurations may be used without departing from the scope and spirit of the invention.

Figure 2D:
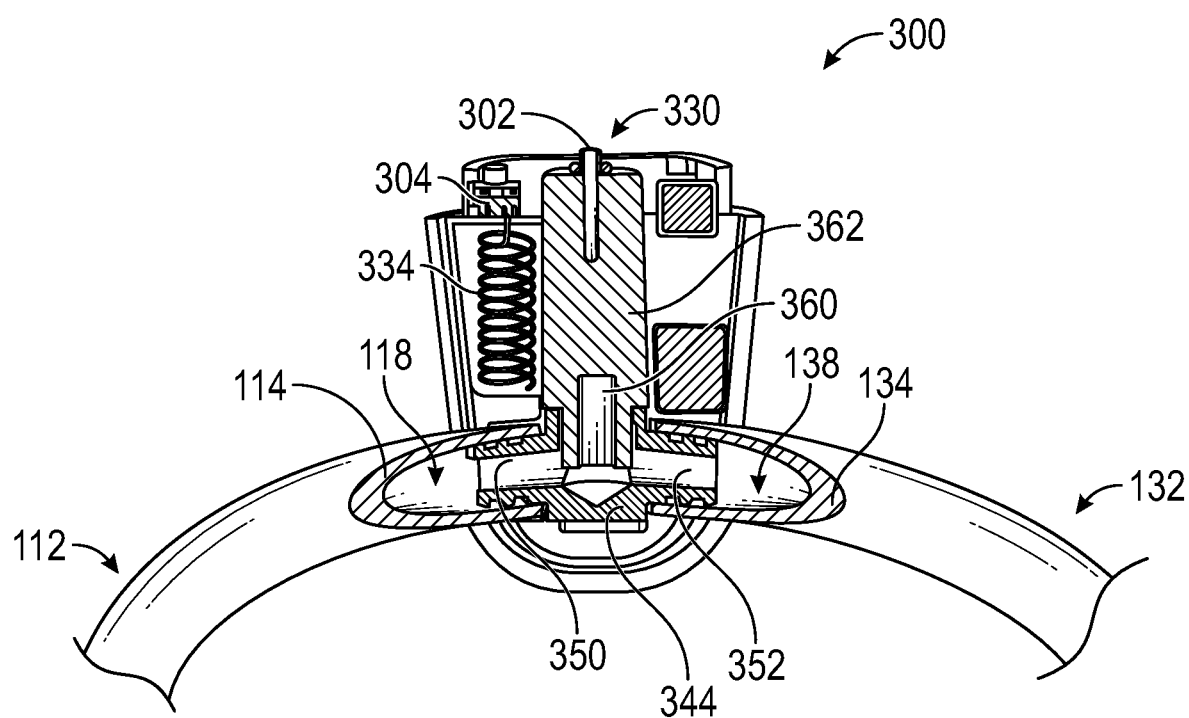

As shown by FIG. 2D, when valve 330 is operated in a known manner, fluid within tubular reservoirs 118, 138 may flow through T-coupler 344 and be dispensed (sprayed) from fluid dispensing port 302. As shown, the T-coupler 344, has fluid passages 350, 352 in fluid communication with one another and a fluid passage 360 of valve 330. When the valve body 362 of valve 330 is opened in a known via actuation of a solenoid, fluid from fluid reservoirs 118, 138 flow through the fluid passages 350, 352 of the T-coupler 344, respectively and through the valve 330 where it is then dispensed from the fluid dispensing port 302.

Figure 13:
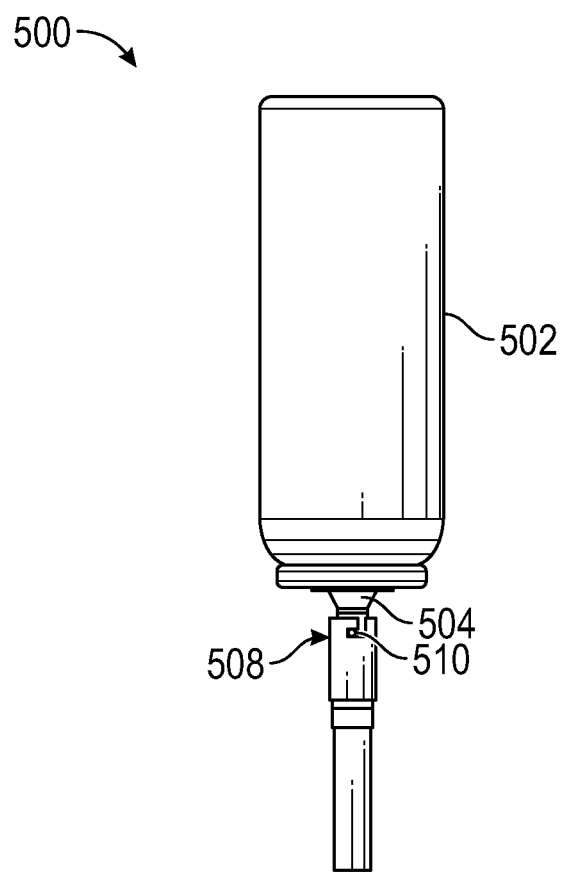
Figure 14A:
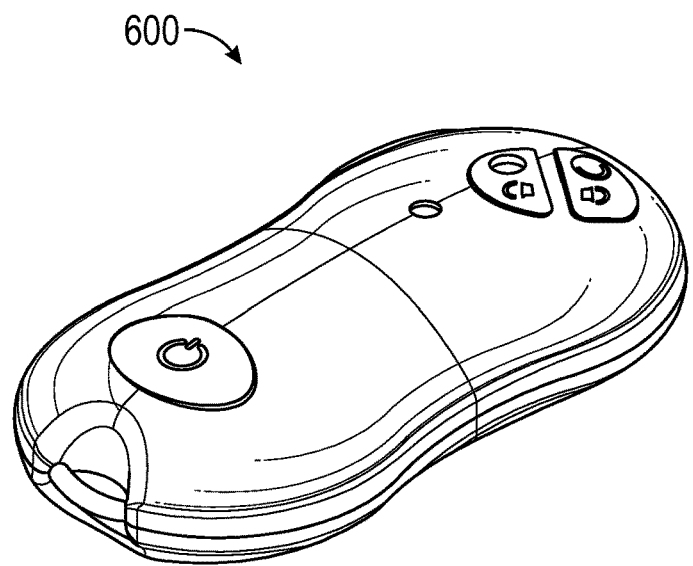
Figure 14B:
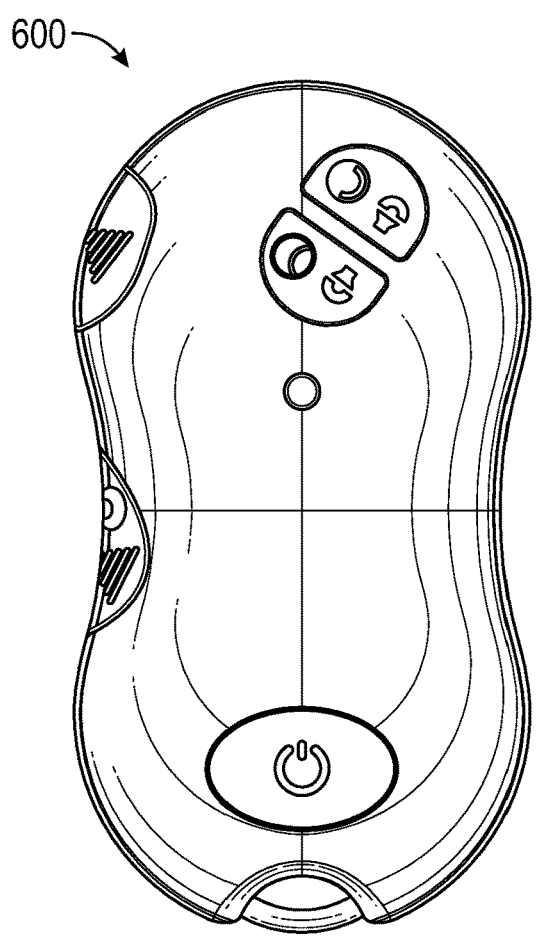
Figure 14C:
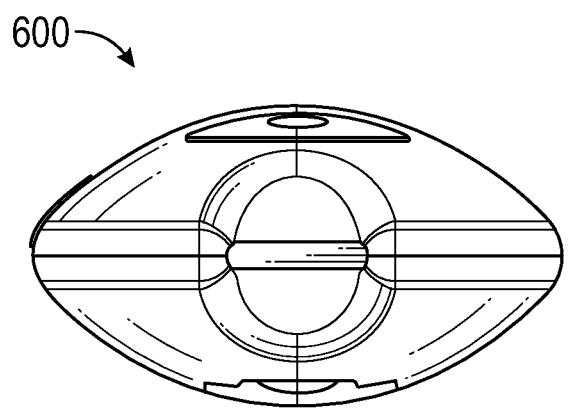
Figure 14D:
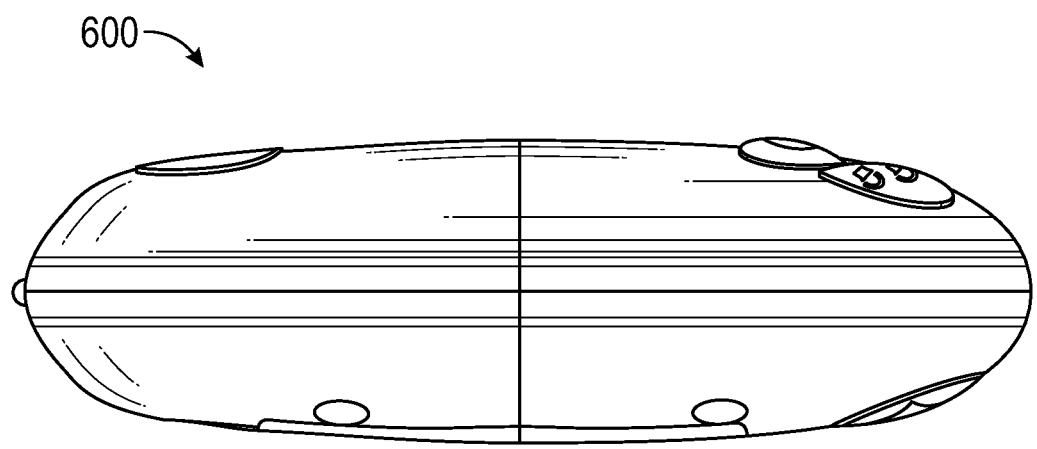
Figure 14F:
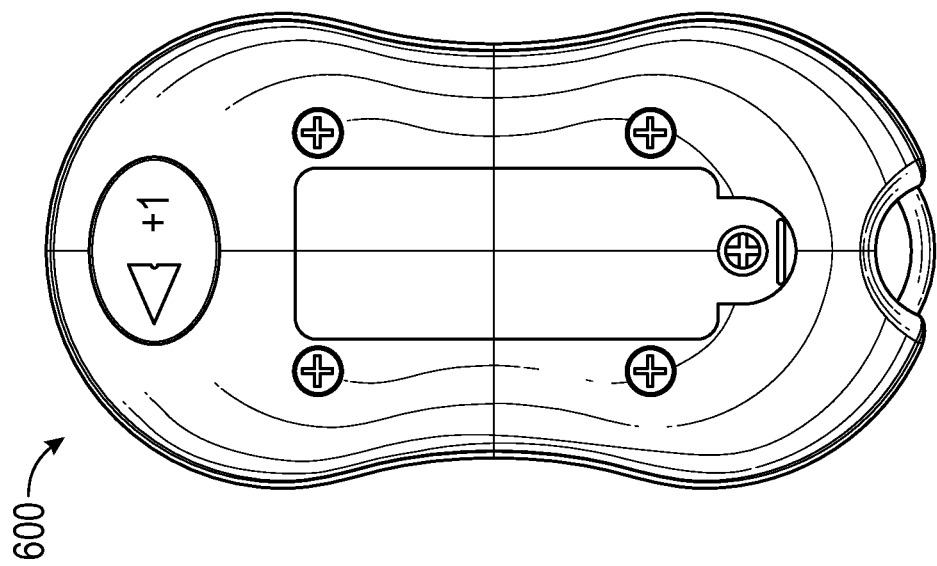
Figure 14E:
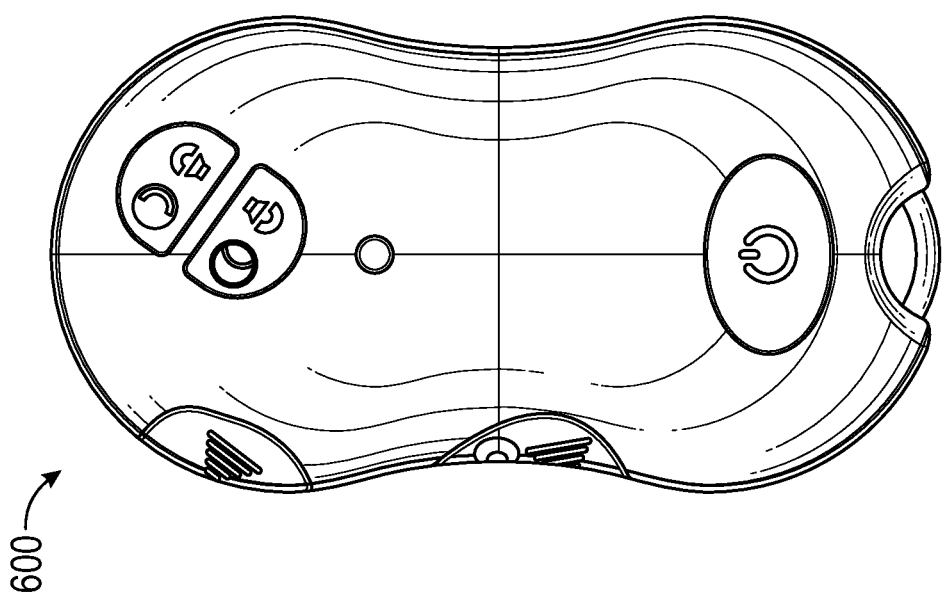
Figure 14H:
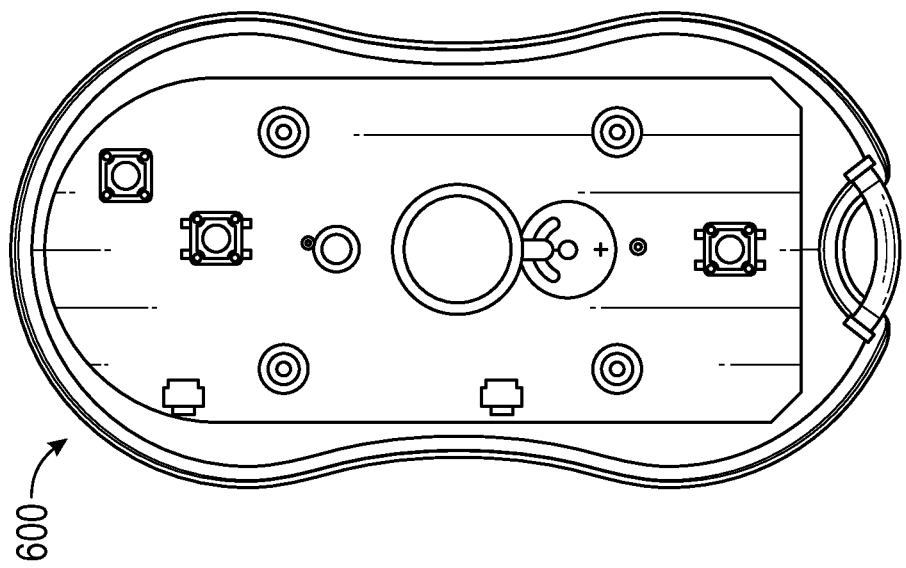
Figure 14G:
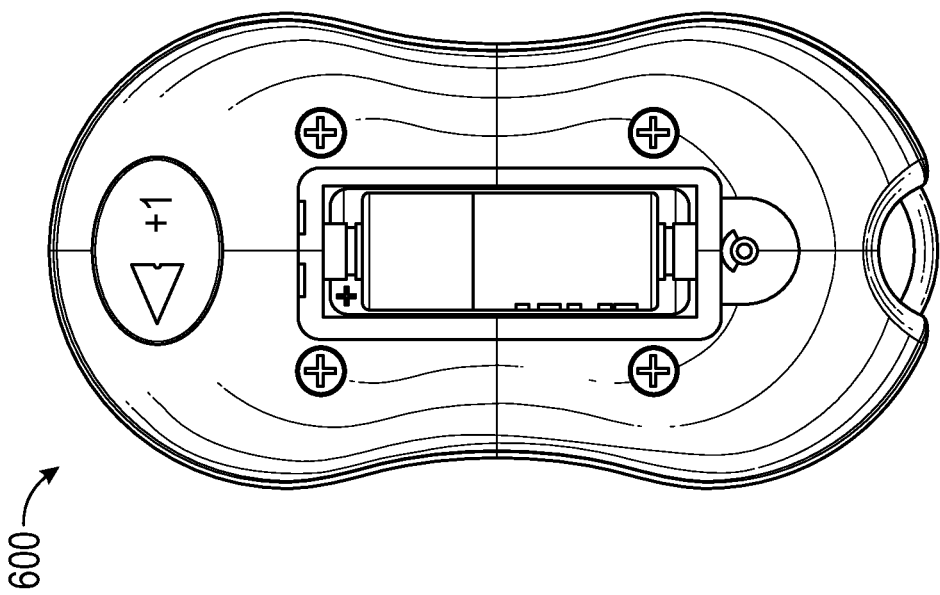

When the fluid within tubular reservoirs 118, 138 becomes low, additional fluid may be introduced into tubular reservoirs 118, 138 through valve 232 in the first connector 202. As shown by FIG. 13, the fluid may be introduced from a cylindrical pressured fill/refill canister 500. The pressurized refill canister 500 may comprise a metal reservoir/tank 502 and a filling nozzle 504. Refilling nozzle 504 includes a rigid tubular (hollow) cylindrical stem 506. The reservoir/tank 502 may have volume less than about 6 fluid ounces, and may more particularly be about 3 fluid ounces.

In order to introduce fluid from tank 502 into tubular reservoir 118, filling nozzle 504 may be inserted into bore 216 of the first connector 202 with translational movement until the filling nozzle 504 makes contact with valve body 234 of valve 232, and depresses the valve body 234 to an open position to open the valve 232 against the bias of a spring (not shown). Thereafter, fluid may flow from the pressured fill/refill canister 500 through the first connector 202 to the lower pressure tubular reservoir 118 and to tubular reservoir 138. When filling of the tubular reservoirs 118, 138 is complete, the filling nozzle 504 may be retracted from bore 216 of the first connector 202 with translational movement until the filling nozzle 504 no longer makes contact with valve body 234 of valve 232, at which time the valve body 234 raises to a closed position to close the valve via the force of the spring and/or the pressurized fluid in the tubular reservoirs 118, 138.

It may be appreciated that use of a pressurized fluid requires head space, which is basically space for the propellant. However, a device that releases pressurized fluid may not be made in a way that the valve fluid passage 360 is disposed in the head space. If the valve fluid passage 360 is disposed in the head space, the propellant will flow through the valve 330 when opened rather than the liquid fluid, especially as the storage tank becomes emptier and emptier, and miss a spray (a "dry" spray) when in fact they were supposed to spray the liquid.

The basic geometry of tubular reservoirs 118, 138 will result in the head being located adjacent the end regions 122, 142 of first elongated tubular member/tubing segment 110/112 and the second elongated tubular member/tubing segment 130/132, as well as the and first connector 202 and second connector 250, due to gravity causing the gas propellant to rise above the liquid fluid as the apparatus 100 hangs around the neck of an animal. As such, the head space is always on top of the fluid far away from the take up port of the valve 330. The geometry makes it virtually impossible for the animal to get a false spray due to head space in front of the take up exit port. In short, due to the geometry of our tank all the head space is on top of the dogs neck and the take up port for fluid exit is always covered with fluid. This eliminates a need for complex pickup tubes, which are prone to failure.

In order to better facilitate fluid transfer from the fluid tank 502 to the tubular reservoirs 118, 138, the stem 506 of the filling nozzle 504 may include at least one radially extending pin 508 having a bulbous head 510 (similar to the second connector 250) which operates as a bayonet connector lug. Similar to radially extending pin 254, radially extending pin 508 may be first disposed in the axially extending segment 224a of the L-shaped aperture 224 and, after radially extending pin 508 bottoms out against the wall section 222 of the first connector 202 defining the axially extending segment 224a of the L-shaped aperture 224, at least one of the first connector 202 and the and the filling nozzle 504 may then be rotated relative to one another, such that the radially extending pin 508 is now disposed in the circumferentially extending segment 224b of the L-shaped aperture 224.

Once the radially extending pin 508 of the filling nozzle 504 is disposed in the circumferentially extending segment 224b of the L-shaped aperture 224, the first connector 202 and the second connector 250 may not be separated translationally (axially/longitudinally), due to a mechanical interference (i.e. positive mechanical engagement) formed between the radially extending pin 508 of the filling nozzle 504 and the wall section 222 of the first connector 202 forming an interlocked mechanical connection. Once the interlocked mechanical connection is formed, manual force placed on the pressurized refill canister 500 by the user to depress the valve body 234 to an open position to open the valve 232 may be removed while the tubular reservoirs 118, 138 continues to be filled. As such, a unique filling apparatus is included that allows an individual refilling the tubular reservoirs 118, 138 with pressurized fluid to easily mechanically connect the refilling canister 500 in place, without additional assistance from the individual spent after connecting the canister 500, during refilling of the tubular reservoirs 118, 138. This filling apparatus is also unique in that it allows for a leak-free connection and facilitates hands-free filling of the tubular reservoirs 118, 138.

As shown the filling nozzle 504 may be a discrete component of the pressurized refill canister 500, which is separable from the tank 502, and which may be connected to the tank 502 may by releasable snap-fit connection.

Alternatively or additionally, in order to increase the volume of fluid, the refill canister 500 may remain coupled in the foregoing manner during training use of the apparatus 100, for example, when the apparatus 100 is part of a garment or a harness and coupling of the first connector 202 with the second connector 250 may not be required.

Furthermore, when the apparatus 100 is empty, delay in filling the apparatus 100 may be eliminated in the foregoing manner. The user may simply remove the empty canister 500 with a quick rotation of the bayonet connector, and attached a refill canister 500 with the same opposite motion. As such, the ease of use of a detachable remotely-connected canister 500 with the apparatus 100 may eliminate time required to refill the on-board tubular reservoirs 118, 138. When the canister 500 is emptied of fluid, training is interrupted only by the time it takes to remove and replace the canister 500.

Once the tubular reservoirs 118, 138 are filled with fluid and pressurized, the fluid may be dispensed and delivered to the animal. The fluid may be delivered to the animal in the form of a dose of pressurized fluid, particularly a spray, to a localized area (e.g. proximity of the face, particularly the mouth, nose and/or eyes) particularly suitable to modify the desired or undesired behavior in response to training stimuli during a training session or other training scenario. The fluid utilized is a liquid generally considered harmless to the animal, and may utilize different types of chemistries including citronella, water and pheromones as well as other ingredients.

In other embodiments, during a training scenario, the canister 500 may be replaced on the fly with a replacement canister 500 containing a different fluid chemistry. As such, with the use of pre-filled removable remotely-connected canister 500, the animal trainer can easily switch from an aversive negative behavior modification to a pheromone or other positive-reinforcement behavior modification.

While the apparatus 100 may be particularly wearable by the animal, such as by being disposed around the neck of the animal, the animal does not necessarily need to wear the apparatus 100 for behavior modification. For example, the apparatus 100 may be disposed in an area remote from the animal (but within dispensing distance) or adjacent the animal during training, such as on the end of a leash connected to the animal, as shown in FIG. 1. As shown in FIG. 1, the elongated tubing member 110/tubing segment 112 is disposed in the tether 24 of the leash 30, while the fluid dispensing device 300 is attached adjacent the end of tether 24.

The annular ring apparatus 100 responds to an auditory signal, such as a bark from a canine, that falls within a pre-selected frequency and decibel range of the microphone 342. This response, however, is only possible if motion of the training animal has been detected above a certain predetermined threshold.

More particularly, the apparatus 100 may use integral microphone 342 and microprocessor to interpret the audio input from the audible barking of a canine. The criteria for activation of the spray valve 330 is based upon the frequency and decibels of the incoming sound. Again, the microphone and listening circuitry is only active when the apparatus 100 detects motion of the training animal that meets a set of criteria to satisfy motion.

In certain embodiments. the annular ring apparatus 100 may use sound recognition integrated circuits and microprocessors to record the unique auditory output of the training animal (such as a bark of a dog) and use the recognized auditory input of the animal as the trigger for a corrective spray to dissuade the animal from barking. The auditory recordings of the training animal may be placed directly into the training apparatus 100, into a handheld remote or into a handheld software application contained within a mobile phone or similar smart device. The use of the technology greatly reduces the potential for inaccurate triggering of the spray training event due to input stimuli from an outside source and not the training animal.

In certain embodiments, the tubular fluid reservoir 118 of the annular ring apparatus 100 is elongated and concealed within a leash assembly. The apparatus 100 is positioned at the terminus of the leash near the training animal in order to facilitate the effective delivery of the pressurized fluid either to modify behavior, whether to reinforce positive behavior or dissuade negative behavior. It may be appreciated that this configuration of the spray training device has applications to control negative pulling behavior in dogs as well as positive reinforcement training in horses through a concealed spray delivery device in the halter and bit.

Another embodiment of the apparatus 100 is the behavior modification of positive reinforcement using specifically formulated pheromone for the specific training animal. These synthetic pheromones help control stress-related behaviors and are helpful in situations like meeting new pets, visitors or new family members as well as rewarding other positive behaviors. Those skilled in the art of animal behavior modification will also see that a number of positive-reinforcement fluid agents could be delivered to a wide range of training animals including dogs, cats, equine and others. Periods of quiet/no barking are rewarded with pheromone spray, or timed dosage for cats.

Referring to FIGS. 14A-14H, there is shown a hand-held device (e.g. a remote control) 600 that electronically wirelessly communicates with the apparatus 100 worn by the training animal. The hand-held device 600 in this embodiment is the trigger for the spray event to happen, allowing the human trainer to modify the behavior of the animal either with aversive spray to dissuade negative behavior or positive/pleasurable spray to encourage positive behavior. The hand-held device 600 communicates directly with the annular ring apparatus 100 as part of system 10, and allows for variable levels of sprayed fluid to be delivered in different behavior modification techniques.

Another embodiment of the annular ring apparatus 100 is the use of the aversive spray to create a boundary condition to exclude the training animal from a specific area. The annular ring apparatus 100 may, in this embodiment, be worn by the animal or may be positioned in the area that is desired to be exclusionary to the training animal. When the animal enters within proximity to the exclusionary area then the trigger condition for the negative behavior spray aversive is met and a spray is delivered to the training animal.

Another embodiment of the annular ring apparatus 100 may have a battery conservation mode for battery 324. All the different functions that can be programmed into the printed circuit boards 336, 240 that run the collar (GPS, RFID recognition, bark noise processing, opening and closing the solenoid may be understood as high battery drain functions. Animals, such as canine and felines, sleep and lay substantially motionless between 12 to 18 hours a day. Adding a motion sensor that deactivates upon recognition that the dog is resting allows the user of apparatus 100 to leave the collar on the animal without turning it off and maintain battery life. On an anti bark collar this feature may allows a canine one free bark prior to an aversive spray correction. This is an important function as many pet owners use dogs as alter systems to detect when someone is coming on their property. The owner wants the initial bark, but does not want the continued incessant barking.

Figure 15:
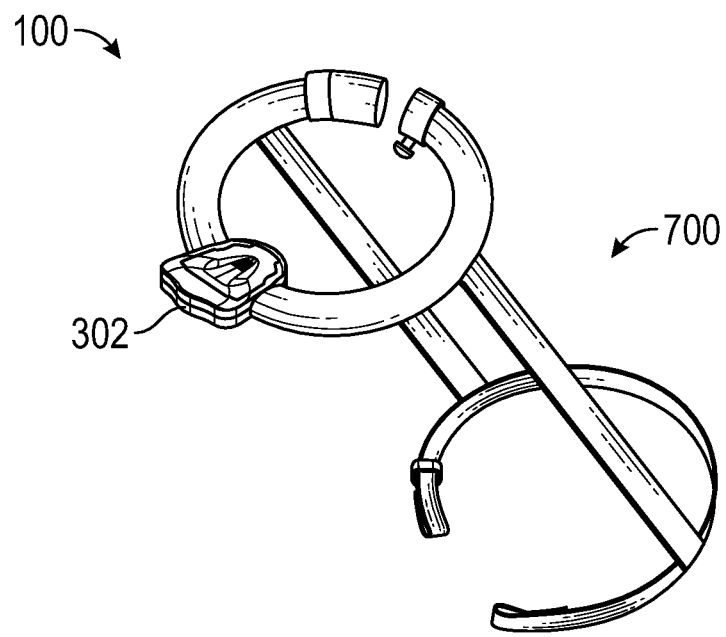

As shown by FIG. 15, in certain embodiments, annular ring apparatus 100 may be part of a harness 700, particularly used to walk the animal.

Figure 16:
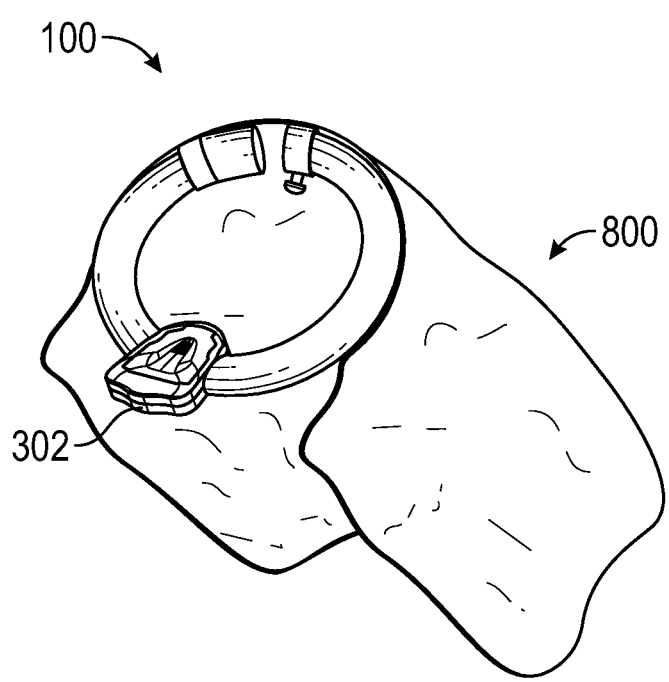

As shown by FIG. 16, in certain embodiments, annular ring apparatus 100 may be part of a garment of clothing (shown as a petticoat), particularly to keep the animal warm and/or protect the animal from the environment.

Referring to FIGS. 17-20, there is shown another embodiment of apparatus 100. As shown, apparatus 100 similarly comprises a tubular band 102 and a fluid dispensing device 300. Separable connector device 200 has been eliminated.

As shown, similar to the prior embodiment, tubular band 102 comprises the first elongated tubular member 110 and the second elongated tubular member 130. First elongated tubular member 110 comprises the first flexible (resiliently deformable) tubing segment 112 having the annular (cylindrical) tubular body 114, which contains and defines the (cylindrical) lumen 116, which provides the tubular reservoir 118 of the first elongated tubular member 110 and the tubular band 102. Once again, the tubular body 114 is seamless along its longitudinal length.

Similarly, the second elongated tubular member 130 comprises the second flexible (resiliently deformable) tubing segment 132 having the annular (cylindrical) tubular body 134, which contains and defines the (cylindrical) lumen 136, which provides the tubular reservoir 138 of the second elongated tubular member 130 and the tubular band 102. Once again, the tubular body 134 is also seamless along its longitudinal length.

As shown, the second end region 122 of the tubing segment 112/tubular body 114 of the first tubular member 110 does not include the second end coupling device 152 or the first connector 202. Rather, a barbed first plug 180 is inserted into the into the lumen 116 at the second end region 122 of the first tubing segment 112, which forms a press (interference) fit with the tubular body 114.

Similarly, the second end region 142 of the tubing segment 132/tubular body 134 of the second tubular member 130 does not include the second end coupling device 162 or the second connector 250. Rather, a barbed second plug 182 is inserted into the into the lumen 136 at the second end region 142 of the second tubing segment 132, which forms a press (interference) fit with the tubular body 114.

Apparatus 100 further retains housing 310, with fluid dispensing port 302, on/off button switch 304, battery 324, charging port 326, fluid valve 330, printed circuit board 336 and coupling 344 disposed therein.

As shown, the first elongated tubular member 110/tubing segment 112 and the second elongated tubular member 130/tubing segment 132 form a closed annular ring, where at least a portion 190, 192 of their respective lengths overlap (extend side by side) adjacent one another. As shown, each of the first elongated tubular member 110/tubing segment 112 and the second elongated tubular member 130/tubing segment 132 have a radial length which encompasses an arc of at least 180 degrees, but which may be more depending on the length of the overlapping portions 190, 192.

Figure 17:
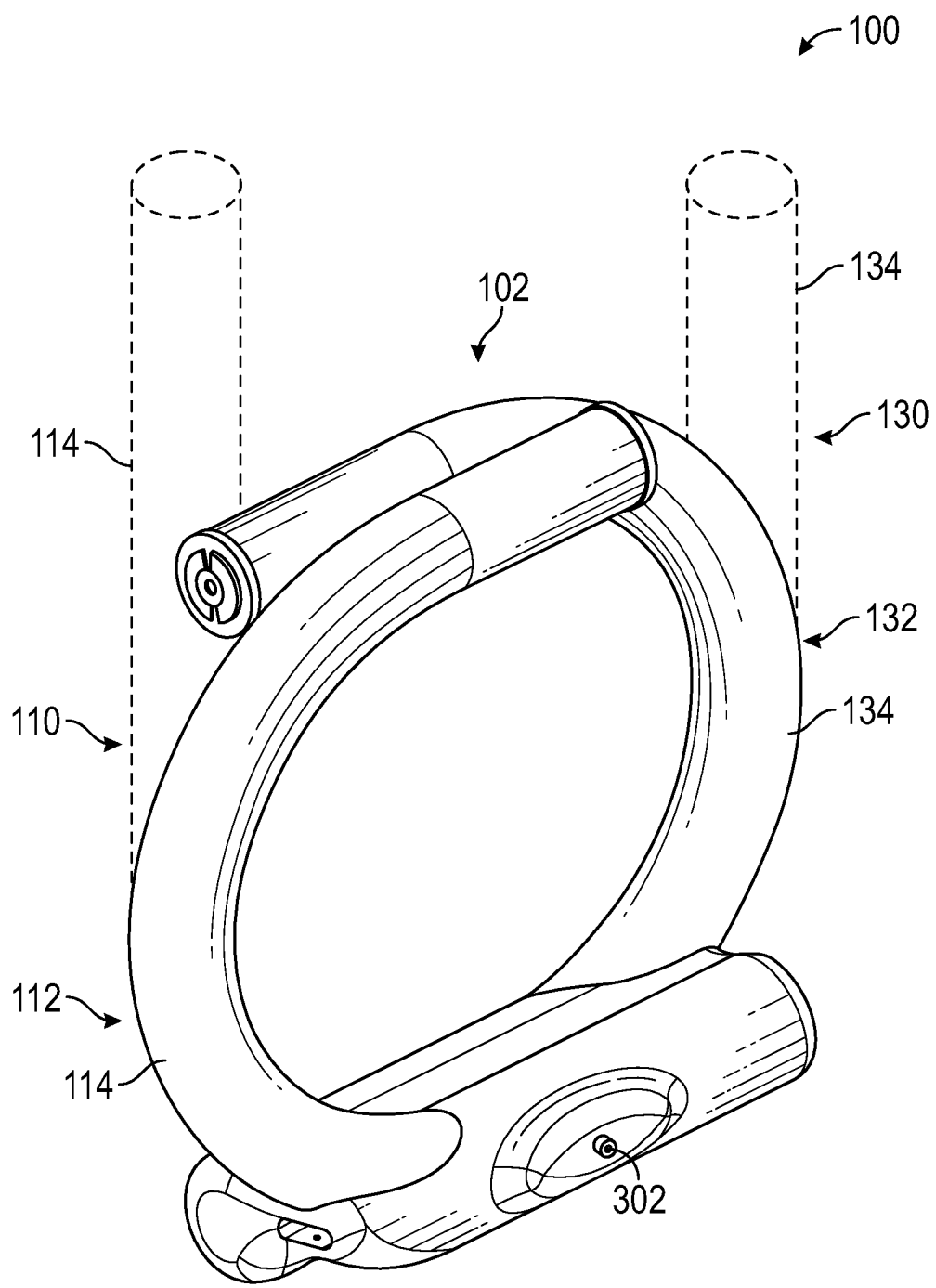
Figure 18:
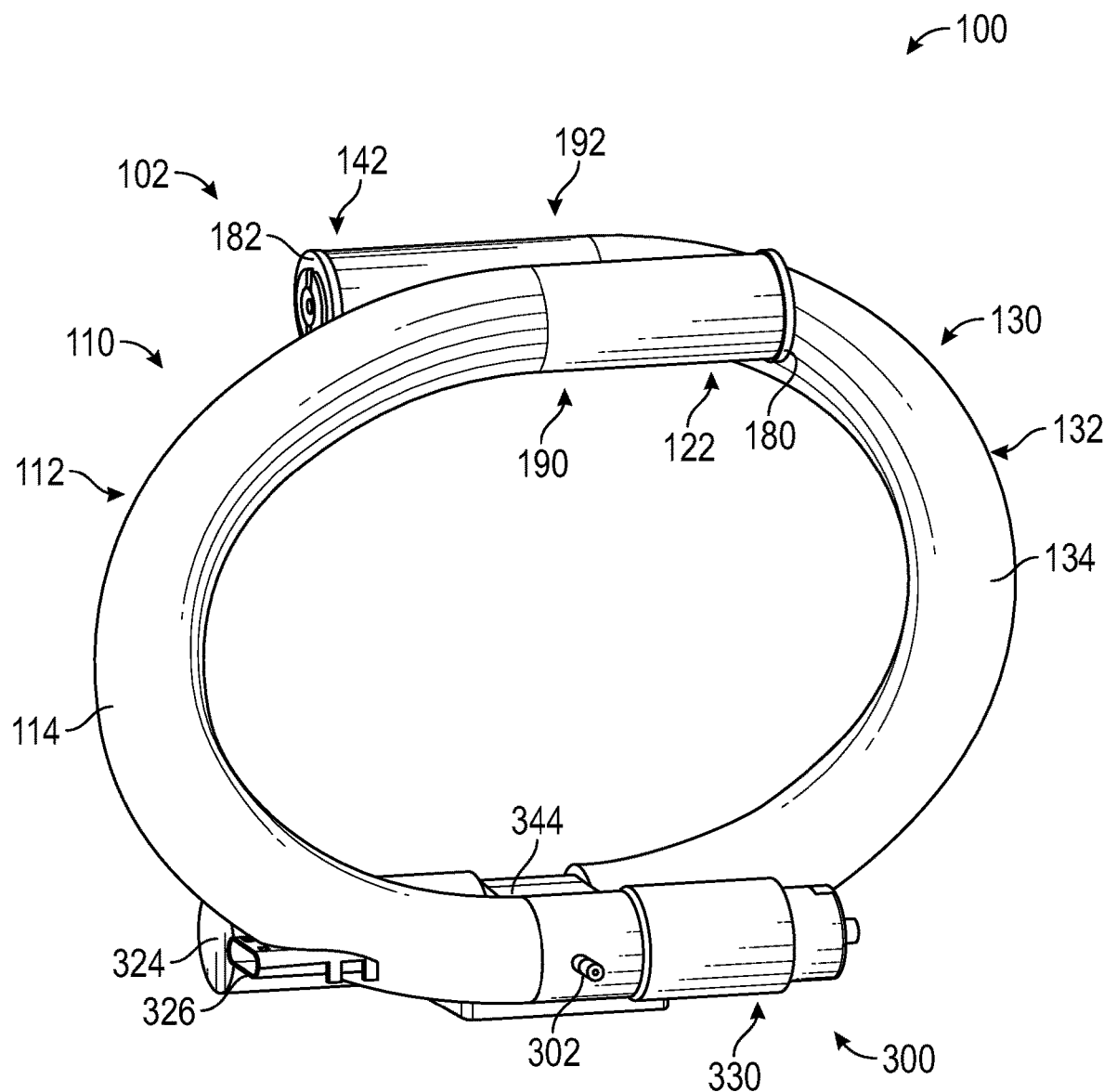
Figure 19:
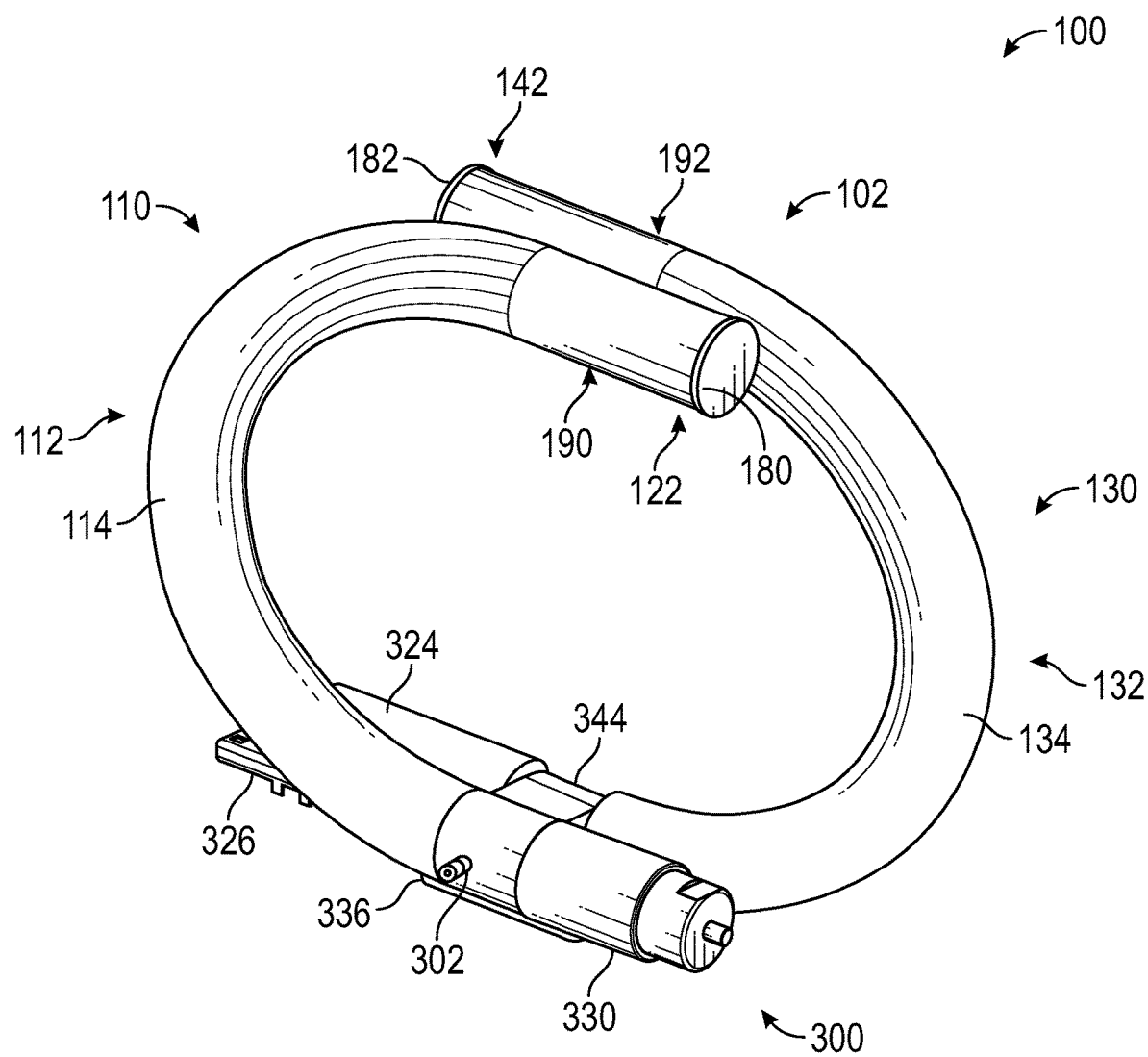
FIG. 19 is another perspective view of the annular ring apparatus of FIG. 17 with the housing removed.
Figure 20:
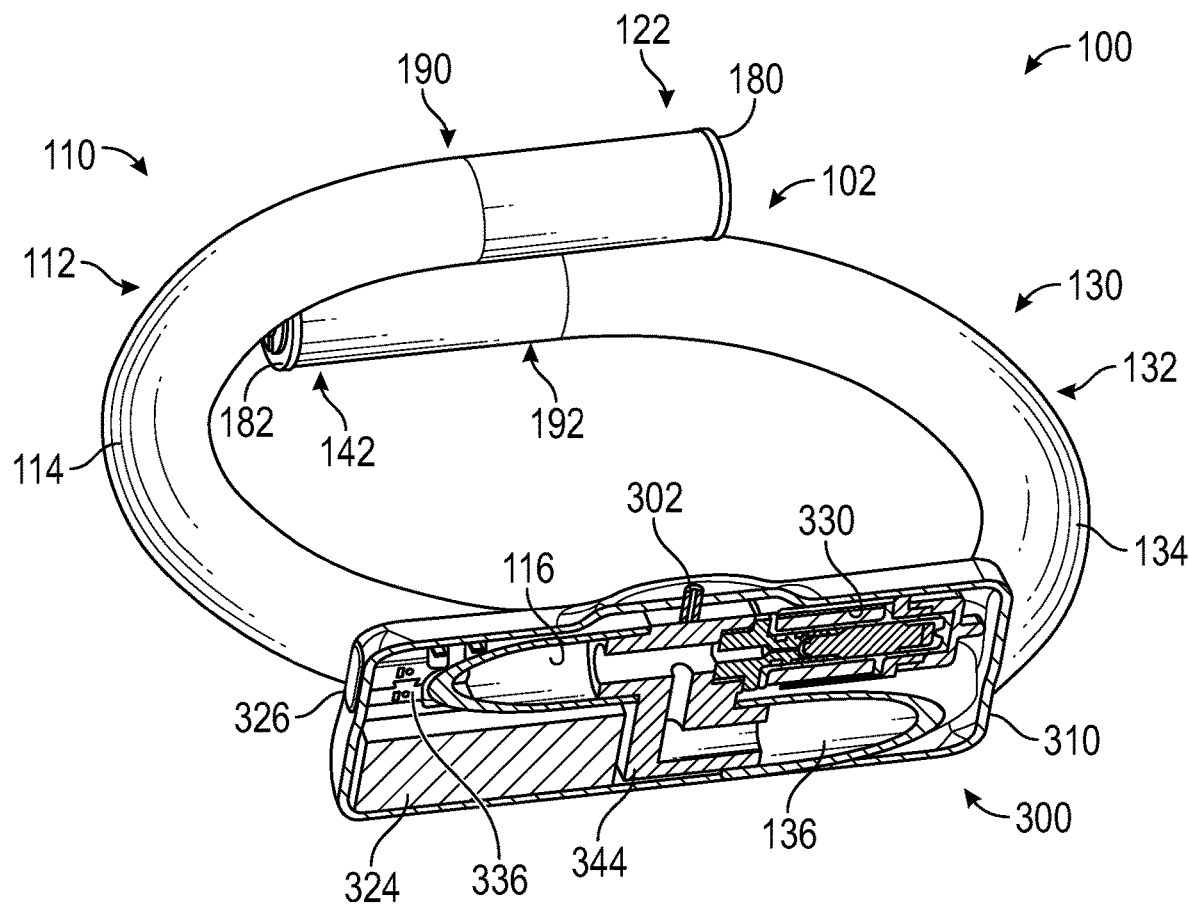
FIG. 20 is a cross sectional view of the annular ring apparatus of FIG. 17 taken through the housing.

Referring to FIG. 17, in order to place the apparatus 100 around the neck of an animal, the flexible first elongated tubular member 110/tubing segment 112 and the second elongated tubular member 130/tubing segment 132 may be elastically deformed up to 90 degrees from their closed positions (such that each only encompasses an arc of 90 degrees as shown in dotted lines), and bent by hand into an opened position having a general shape of a U-shaped open annular ring, at which time the animal may place its neck within the opened annular ring. At such time, the flexible first elongated tubular member 110/tubing segment 112 and the second elongated tubular member 130/tubing segment 132 may be released from the open position, and return to the closed position due to elastic recovery of the flexible first elongated tubular member 110/tubing segment 112 and the second elongated tubular member 130/tubing segment 132.

Figure 21:
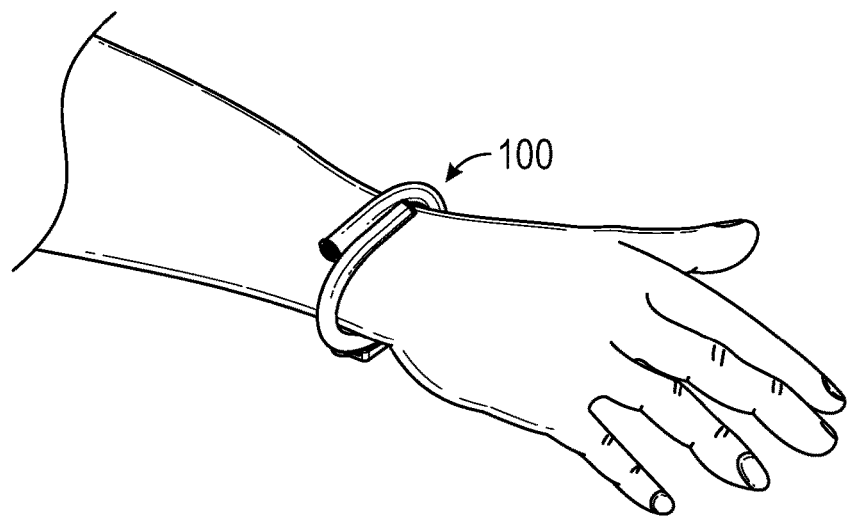
FIG. 21 is a perspective view of the annular ring apparatus of FIG. 17 disposed around a wrist of a human.
Figure 22:
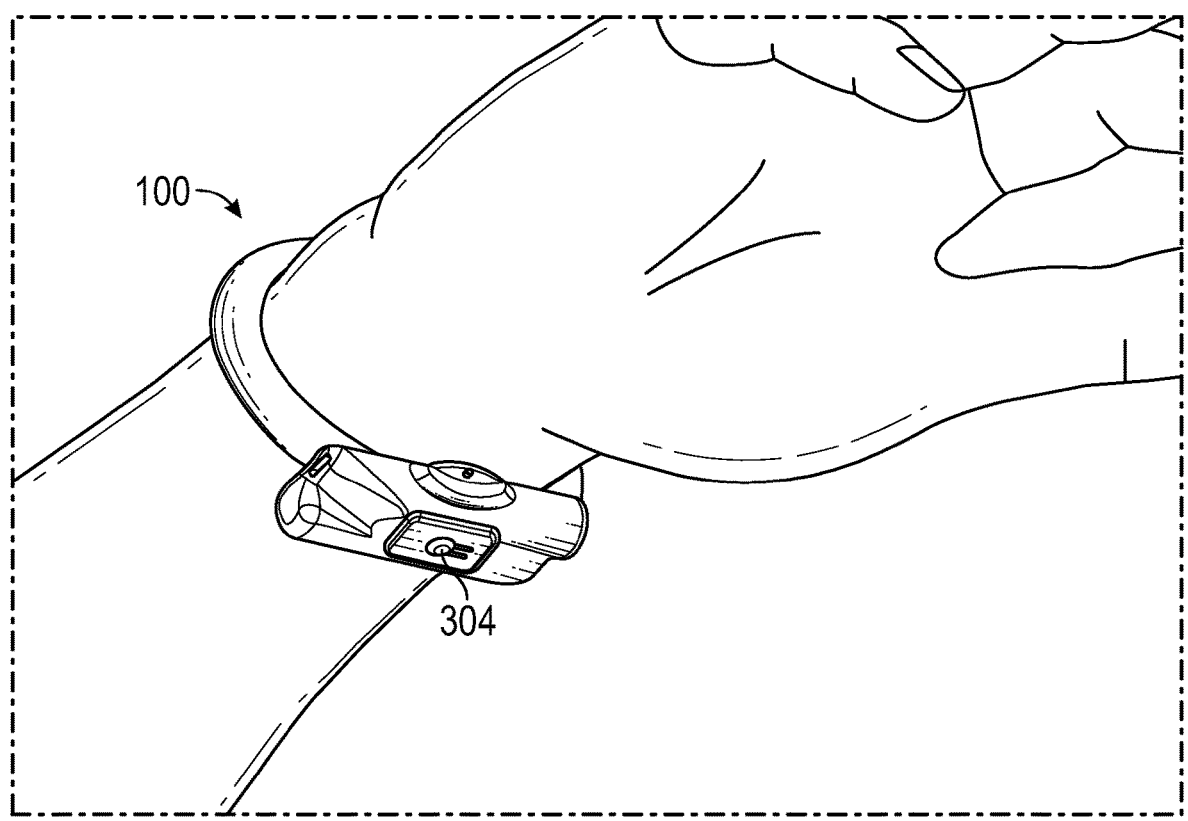
FIG. 22 is another perspective view of the annular ring apparatus of FIG. 17 disposed around the wrist of a human.
Figure 23:
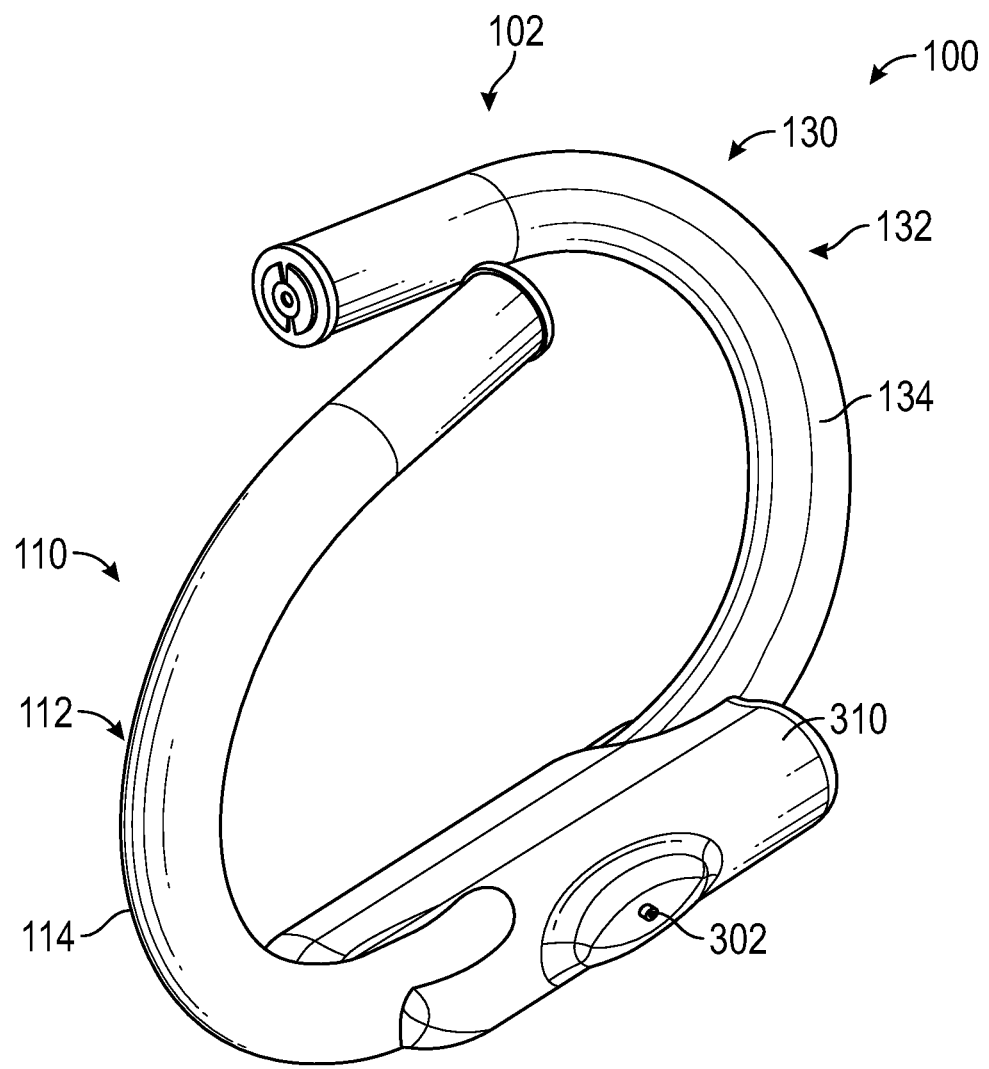
FIG. 23 is a perspective view of the annular ring apparatus of FIG. 17 elastically deformed to increase an area of the central aperture to place the annular ring apparatus around the wrist.

In a different application, as shown in FIGS. 21-23, annular ring apparatus 100, particularly of FIGS. 17-20, may be disposed on a human body, such as an appendage/limb. As shown annular ring apparatus 100 is disposed around an arm, and more particularly disposed around the wrist. In such application, the reservoirs 118, 138 may be filled with pressurized liquid hand sanitizer comprising alcohol, or other sanitization fluid, and/or an antiviral fluid which may kill a virus, such as COVID-19, a dose of which may be dispensed onto the palm of the hand by pushing button switch 304.

The annular ring apparatus 100 described herein may be used in other animal training, confinement, exclusion or other applications beyond what is described. Either all or some of the embodiment variations may be used with a spray training program to achieve the desired animal behavior. It may also be appreciated that the training methodology defines the operational parameters of the annular ring apparatus 100. As such, the disclosed embodiments are not intended to limit the scope of the disclosure, and that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LIST OF REFERENCE CHARACTERS 10 system
20 clasp
24 tether
30 leash
100 annular ring apparatus
102 tubular band
110 first elongated tubular member
112 first tubing segment
114 annular (cylindrical) tubular body
116 (cylindrical) lumen
118 fluid reservoir
120 first end region of first elongated tubular member/tubing segment
122 second end region of first elongated tubular member/tubing segment
130 second elongated tubular member
132 second tubing segment
134 annular (cylindrical) tubular body
136 (cylindrical) lumen
138 fluid reservoir
140 first end region of second elongated tubular member/tubing segment
142 second end region of second elongated tubular member/tubing segment
150 first elongated member first end coupling device
152 first elongated member second end coupling device
160 second elongated member first end coupling device
162 second elongated member second end coupling device
170 aperture
180 plug
182 plug
190 portion of first elongated tubular member/tubing segment
192 portion of second elongated tubular member/tubing segment
200 separable connector device
202 first connector
204 cylindrical body
206 barbed prong
208 O-ring seal
210 barb
216 through-bore
218 entrance region
220 cylindrical cavity/socket
222 cylindrical wall section
224 L-shaped aperture
224a axially extending segment of L-shaped aperture
224b circumferentially extending segment of L-shaped aperture
226 intermediate region
228 cylindrical cavity/socket
230 cylindrical wall section
232 valve
234 valve body
240 exit region
250 second connector
252 cylindrical protrusion
254 pin
256 bulbous head
258 terminal end
260 permanent magnet 300 fluid (spray) dispensing device
302 fluid (spray) dispensing port
304 on/off button switch
310 housing
312 housing front member
314 housing rear member
316 housing top member
320 battery pack
322 battery pack cover
324 battery
326 battery charging port
328 battery charger
330 Fluid valve
332 RF receiver
334 helix antenna
336 printed circuit board
338 Solenoid driver
340 printed circuit board
342 microphone
344 coupling/T-coupler
350 fluid passage
352 fluid passage
360 fluid passage
362 valve body
500 pressurized refill canister
502 tank
504 filling nozzle
506 cylindrical stem
508 pin
510 bulbous head
600 remote control
700 harness
800 garment

What is claimed is:

1. A system to dispense a dose of fluid on an animal, comprising:
an annular ring apparatus configured to extend around the animal, the annular ring apparatus comprising
an electronic fluid dispensing device, wherein the electronic fluid dispensing device is battery powered:
an attachment band configured to attach the annular ring apparatus, including the electronic fluid dispensing device, to the animal;
wherein the attachment band comprises a first tubing segment, wherein the first tubing segment contains a first reservoir; and
wherein the electronic fluid dispensing device dispenses fluid from the first reservoir.

2. The system of claim 1, wherein the first tubing segment has a first tubular body surrounding a first lumen; and
wherein the first lumen contains the first reservoir.

3. The system of claim 2, wherein the first tubular body defines at least a portion of the first lumen and/or at least a portion of the first reservoir.

4. The system of claim 2, wherein the first tubular body has a longitudinal length which extends along a longitudinal length of the attachment band, and wherein the first tubular body is seamless along the longitudinal length.

5. The system of claim 2, wherein the first tubular body has at least one of a cylindrical outer profile, an oval outer profile or a polygonal outer profile; and
wherein the first tubular body has at least one of a cylindrical inner profile, an oval inner profile or a polygonal inner profile which defines the first lumen.

6. The system of claim 2, wherein the first tubular body is formed of a polymer and/or an extruded tubular body.

7. The system of claim 2, wherein the first tubular body has an outer diameter in a range of 6 mm to 12 mm; and
wherein the first tubular body has an inner diameter in a range of 4 mm to 10 mm.

8. The system of claim 2, wherein the first tubular body has an outer width in a range of 9 mm to 30 mm; and
wherein the first tubular body has an outer thickness in a range of 4 mm to 12 mm.

9. The system of claim 2, wherein the first tubular body is configured to withstand pressure of pressurized fluid in the first reservoir in a range of 5 psi. to 100 psi.

10. The system of claim 2, wherein the first tubing segment comprises a first end region and a second end region;
wherein the first tubing segment first end region is connected to the electronic fluid dispensing device; and
wherein the first tubing segment second end region includes a valve to fill or refill the first reservoir with fluid.

11. The system of claim 10, further comprising:
a pressurized fluid canister and a filling nozzle; and
wherein the valve is openable with the filling nozzle to deliver fluid from the pressurized fluid canister to fill or refill the first reservoir.

12. The system of claim 11, wherein the filling nozzle is mechanically connectable to the pressure fluid canister and a connector disposed at an end region of the first tubing segment.

13. The system of claim 10, wherein the annular ring apparatus further comprises:
two mating connectors comprising a first connector and a second connector;
wherein, when the first connector and the second connector are connected, the annular ring apparatus forms a closed annular ring;
wherein, when the first connector and the second connector are connected, the first connector and the second connector form a mechanical connection and/or a magnetic connection; and
wherein the valve to fill or refill the first reservoir with fluid is disposed within the first connector.

14. The system of claim 13, wherein the closed annular ring has an inner diameter in a range of 50 mm to 250 mm.

15. The system of claim 13, wherein the annular ring apparatus further comprises:
a second tubing segment, wherein the second tubing segment has a second tubular body surrounding a second lumen; and
wherein the second lumen contains a second reservoir.

16. The system of claim 15, wherein the second tubular body defines at least a portion of the second lumen and/or at least a portion of the second reservoir.

17. The system of claim 16, wherein the first tubing segment comprises a first end region and a second end region;
wherein the first tubing segment first end region is connected to the electronic fluid dispensing device;
wherein the first tubing segment second end region includes the first connector;
wherein the second tubing segment first end region and a second end region;
wherein the second tubing segment first end region is connected to the electronic fluid dispensing device; and
wherein the second tubing segment second end region includes the second connector.

18. The system of claim 1, wherein the electronic fluid dispensing device comprises a fluid dispensing port, a battery and one or more electronic components;
wherein the fluid dispensing port, the battery and the one or more electronic components are disposed in an enclosure, wherein the enclosure provides an enclosure which is sealed to meet IP64 and/or IP67 fluid and particulate ingress requirements per International Electrotechnical Commission International Standard IEC 60529:1989+A1:1999+A2:2013.

19. The system of claim 18, wherein the electronic fluid dispensing device is trigged to dispense the dose of fluid on an animal in response to predetermined criteria disposed in the electronic fluid dispensing device, wherein the predetermined criteria include sound emitted by the animal and motion of the animal.

20. The system of claim 1, wherein the electronic fluid dispensing device dispenses fluid from the fluid reservoir as a pressurized spray; and
wherein the annular ring apparatus is configured to extend around a neck of the animal;
wherein, when the annular ring apparatus is attached around the neck of the animal, the electronic fluid dispensing device dispenses the dose of pressurized spray in a proximity of a face of the animal.

21. The system of claim 1, further comprising:
a remote control device; and
wherein the remote control device wirelessly communicates with the electronic fluid dispensing device.

22. The system of claim 1, wherein the annular ring apparatus is a collar.

23. The system of claim 22, wherein the collar is configured to extend around a neck of the animal.

24. The system of claim 1, wherein the annular ring apparatus is part of a harness configured to extend around a torso of the animal.

25. The system of claim 1, wherein the annular ring apparatus is part of a clothing garment for the animal.

26. The system of claim 1, wherein the first reservoir is arranged such that, when fluid is stored in the reservoir and dispensed from the electronic fluid dispensing device, the fluid flows from the first reservoir to the electronic fluid dispensing device.

27. The system of claim 26, wherein the first reservoir is arranged upstream of the electronic fluid dispensing device such that, when fluid is stored in the reservoir and dispensed from the electronic fluid dispensing device, the fluid flows downstream to the electronic fluid dispensing device.

28. The system of claim 1, wherein the annular ring apparatus contains the fluid.

29. The system of claim 28, wherein the fluid is stored in the fluid reservoir and is pressurized at a pressure in a range of 5 psi. to 100 psi.

30. A system to dispense a dose of fluid on an animal, comprising:
an annular ring apparatus configured to extend around the animal, the annular ring apparatus comprising
an electronic fluid dispensing device, wherein the electronic fluid dispensing device is battery powered:
an attachment band configured to attach the annular ring apparatus, including the electronic fluid dispensing device, to the animal;
wherein the attachment band comprises a first tubing segment, wherein the first tubing segment contains a first reservoir;
wherein the electronic fluid dispensing device dispenses fluid from the first reservoir;
wherein the first tubing segment has a first tubular body surrounding a first lumen; and
wherein the first lumen contains the first reservoir.

* * * * *